United States Patent
Balan

(10) Patent No.: US 11,210,869 B2
(45) Date of Patent: Dec. 28, 2021

(54) VEHICLE SAFETY FEATURE IDENTIFICATION AND CALIBRATION

(71) Applicant: CalPro Holdings LLC, Wayzata, MN (US)

(72) Inventor: Todd-Michael Balan, Wayzata, MN (US)

(73) Assignee: CalPro ADAS Solutions, LLC, Wayzata, MN (US)

( * ) Notice: Subject to any disclaimer, the term of this patent is extended or adjusted under 35 U.S.C. 154(b) by 0 days.

(21) Appl. No.: 17/249,025

(22) Filed: Feb. 17, 2021

(65) Prior Publication Data
US 2021/0304522 A1    Sep. 30, 2021

Related U.S. Application Data

(60) Provisional application No. 63/002,889, filed on Mar. 31, 2020.

(51) Int. Cl.
*G01M 17/00*    (2006.01)
*G01M 13/00*    (2019.01)
(Continued)

(52) U.S. Cl.
CPC ............ *G07C 5/006* (2013.01); *G06Q 10/20* (2013.01); *G07C 5/0808* (2013.01)

(58) Field of Classification Search
CPC ........ G07C 5/006; G07C 5/0808; G07C 5/00; G06Q 10/20; G06Q 10/00; G06F 9/00; G06F 9/04; G01M 13/00; G01M 17/00
See application file for complete search history.

(56) References Cited

U.S. PATENT DOCUMENTS 9,412,208 B2 *   8/2016   Greenberg .......... G06F 3/04842
10,042,359 B1 *  8/2018   Konrardy ........... G06Q 10/1095
(Continued)

OTHER PUBLICATIONS

"ADAS CoPilot", Auto Techcelerators, LLC, [Online]. Retrieved from the Internet: <URL: https://www.adascopilot.com>, (Accessed Apr. 21, 2021), 3 pgs.
(Continued)

*Primary Examiner* — Yonel Beaulieu
(74) *Attorney, Agent, or Firm* — Schwegman Lundberg & Woessner, P.A.

(57) ABSTRACT

The present subject matter provides various technical solutions to technical problems facing sensor-based vehicle safety technology. To address problems facing identification of safety features (e.g., safety sensors) for a particular vehicle, a vehicle safety feature identification system may be used to identify a vehicle and the safety features that are installed on that vehicle. To address problems facing identification of which safety sensors require maintenance, a vehicle safety feature maintenance system may be used to identify vehicle safety sensors based on information received about one or more vehicle repairs, such as structural repairs following a vehicle collision. The vehicle safety feature maintenance system may use image data or other inputs to identify a vehicle repair area, identify other vehicle components that must be removed or adjusted to complete the vehicle repair, and identify all vehicle safety sensors and other safety features that will need to be repaired, replaced, or recalibrated.

48 Claims, 11 Drawing Sheets

(51) Int. Cl.
*G07C 5/00* (2006.01)
*G06Q 10/00* (2012.01)
*G07C 5/08* (2006.01)

(56) References Cited

U.S. PATENT DOCUMENTS

| | | | | |
|---|---|---|---|---|
| 10,086,782 | B1* | 10/2018 | Konrardy | B60W 40/04 |
| 10,102,586 | B1* | 10/2018 | Marlow | B64C 39/024 |
| 10,593,135 | B2* | 3/2020 | Noyelle | G07C 5/008 |
| 11,099,104 | B2* | 8/2021 | Iwata | G01N 3/30 |
| 2004/0002794 | A1* | 1/2004 | Pillar | G07C 5/08 |
| | | | | 701/1 |
| 2007/0228703 | A1* | 10/2007 | Breed | B60R 21/206 |
| | | | | 280/735 |
| 2009/0018859 | A1* | 1/2009 | Purifoy | G06Q 10/10 |
| | | | | 705/305 |
| 2016/0133062 | A1* | 5/2016 | Greenberg | G06F 40/117 |
| | | | | 701/29.4 |
| 2018/0040039 | A1* | 2/2018 | Wells | G06Q 30/0283 |
| 2018/0121888 | A1* | 5/2018 | O'Reilly | G06Q 10/20 |
| 2018/0141545 | A1* | 5/2018 | Freytag | B60S 1/56 |
| 2020/0134690 | A1* | 4/2020 | Wang | G06Q 40/02 |
| 2020/0143481 | A1* | 5/2020 | Brown | G06Q 40/08 |
| 2021/0009147 | A1* | 1/2021 | Maag | G01S 13/931 |
| 2021/0163021 | A1* | 6/2021 | Frazzoli | B60W 50/023 |
| 2021/0241026 | A1* | 8/2021 | Deng | G01S 7/41 |

OTHER PUBLICATIONS

"ADASThink", An asTech Company, [Online]. Retrieved from the Internet: <URL: https://adasthink.com>, (Accessed Apr. 21, 2021), 7 pgs.

"Calibration CoPilot", Auto Techcelerators, LLC, [Online]. Retrieved from the Internet: <URL: https://www.calcopilot.com/>, (Accessed Apr. 21, 2021), 5 pgs.

"The Platform", Auto Tech celerators, [Online]. Retrieved from the Internet: <URL: https://www.calcopilot.com/the-platform>, (Accessed Apr. 21, 2021), 12 pgs.

"International Application Serial No. PCT/US2021/024429, International Search Report dated May 3, 2021", 3 pgs.

"International Application Serial No. PCT/US2021/024429, Written Opinion dated May 3, 2021", 4 pgs.

\* cited by examiner

VEHICLE SAFETY FEATURE IDENTIFICATION AND CALIBRATION

CROSS-REFERENCE TO RELATED APPLICATION

This patent application claims the benefit of U.S. Provisional Patent Application No. 63/002,889, filed Mar. 31, 2020, which is incorporated by reference herein in its entirety.

TECHNICAL FIELD

Embodiments described herein generally relate to vehicle safety features.

BACKGROUND

Vehicle safety technology is used to improve the safety of vehicles. Vehicle safety technology may include passive safety measures, such as seat belts and disc brakes. Vehicle safety technology may include active safety measures, such as airbags and anti-lock brakes that are triggered in response to a particular input. Sensor-based vehicle safety technology may receive video images or other sensor input and a provide corrective vehicle control, such as in automatic emergency braking (AEB) systems and automated driver assistance systems (ADAS). Improvements in vehicle safety technology provide increasing levels of safety, but also require additional technological complexity to implement and maintain. What is needed is an improved solution for implementing and maintaining vehicle safety technology.

SUMMARY

Various sensors may be used for vehicle safety technology, such as cameras for lane assist or emergency braking. Following installation of these sensors during the manufacturing of a vehicle, the sensor-based vehicle safety technology undergoes a rigorous calibration to ensure the sensors and vehicle safety systems are operating as intended. However, the performance of the sensors may be reduced over the life of the vehicle. For example, a vehicle safety sensor may become misaligned while performing maintenance of the vehicle. This is particularly true when performing safety sensor repair or replacement following a vehicle collision. Even if the safety sensor itself is not repaired or replaced, each safety sensor that is affected by vehicle maintenance or repair must be identified and recalibrated. Additionally, different combinations of safety sensors may be used on each vehicle, further increasing the complexity and costs associated with identification and recalibration of each sensor.

The present subject matter provides various technical solutions to technical problems facing sensor-based vehicle safety technology. To address problems facing identification of safety features (e.g., safety sensors) for a particular vehicle, a vehicle safety sensor identification system may be used to identify a vehicle and the safety features, safety systems, and safety sensors that are installed on that vehicle. This vehicle sensor identification system may use a combination of sensor data available from the vehicle itself, general information (e.g., vehicle make, year, model), and vehicle-specific information from the manufacturer or original seller of that individual vehicle (e.g., sensors listed on the vehicle build sheet). To address problems facing identification of which sensors require maintenance, a vehicle sensor maintenance system may be used to identify vehicle safety features based on information received about one or more vehicle repairs, such as structural repairs following a vehicle collision. The vehicle sensor maintenance system may use image data or other inputs to identify a vehicle repair area, identify other vehicle components that must be removed or adjusted to complete the vehicle repair, and identify all vehicle safety features that will need to be repaired, replaced, or recalibrated. The list of vehicle safety features may include a combination of safety features that are generic to all vehicles of a given make and model, along with safety features that are specific to the individual vehicle.

DESCRIPTION OF EMBODIMENTS

The following description and the drawings sufficiently illustrate specific embodiments to enable those skilled in the art to understand the specific embodiment. Other embodiments may incorporate structural, logical, electrical, process, and other changes. Portions and features of various embodiments may be included in, or substituted for, those of other embodiments. Embodiments set forth in the claims encompass all available equivalents of those claims.

Figure 1:
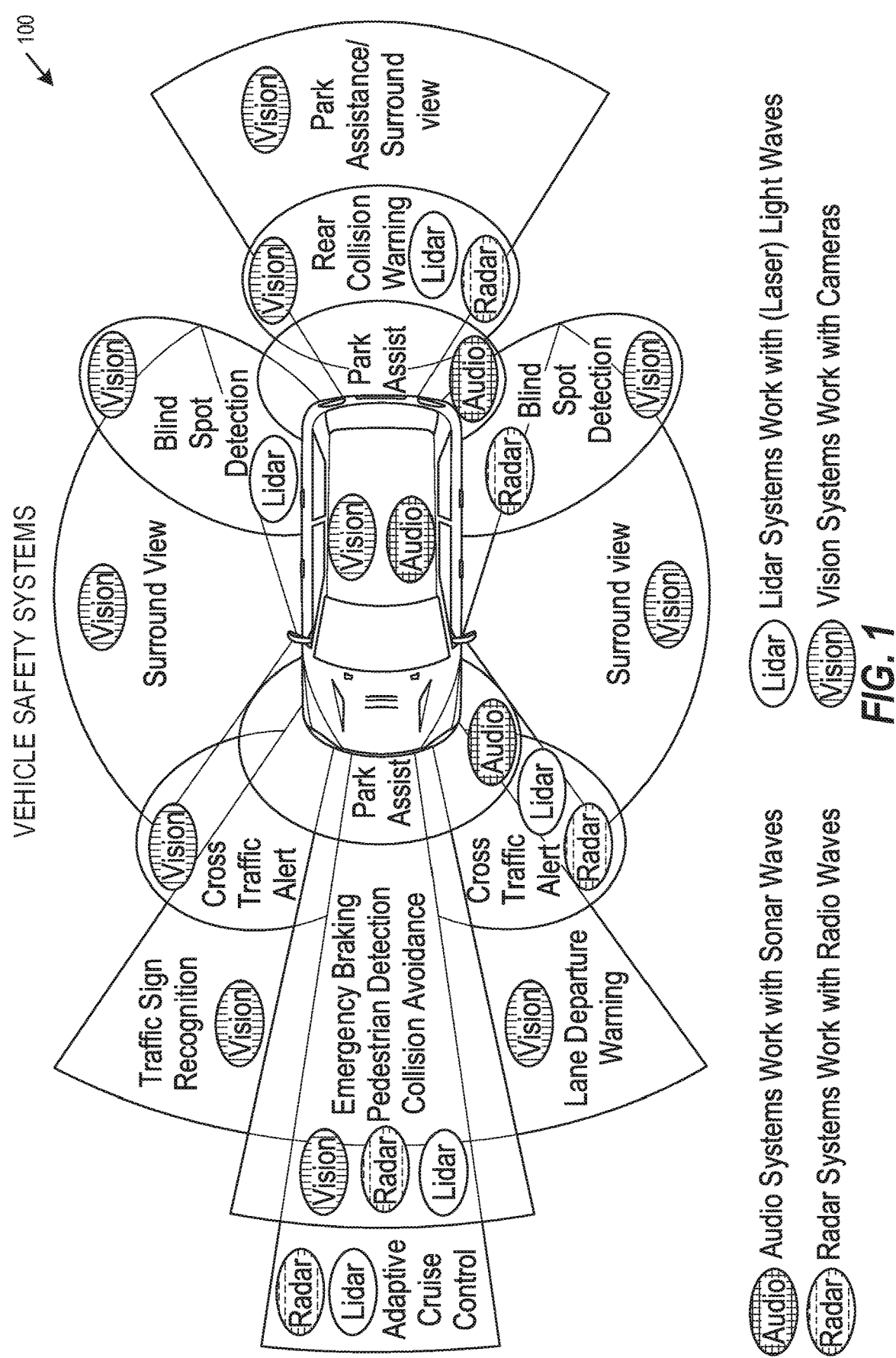
FIG. 1 is a diagram of a vehicle safety system, in accordance with at least one embodiment.

FIG. 1 is a diagram of a vehicle safety system 100, in accordance with at least one embodiment. System 100 includes multiple vehicle safety subsystems, which may include one or more sensors for an automatic emergency braking (AEB) system and for an automated driver assistance system (ADAS). The AEB system may include a collision warning system and a collision intervention system. The collision warning system may include a blind spot warning, a forward collision warning, a lane departure warning, a parking collision warning, or a rear cross-traffic warning. The collision intervention system may include automatic emergency braking, automatic emergency steering, or reverse automatic braking. The ADAS may include driving control assistance and parking assistance. The driving control assistance may include adaptive cruise control, lane keeping assistance, or active driving assistance. The parking assistance may include a backup camera, a surround view camera, an active parking assistance camera, remote parking assistance, or trailer assistance. Additional driver assistance systems may include automatic high beams, driver monitoring, a heads-up display, or night vision. These vehicle safety subsystems may require recalibration whenever a vehicle body panel or other vehicle component is repaired or removed to facilitate repair of another vehicle component. Recalibration is particularly important for safety systems and their components, such as an AEB system and an ADAS.

Figure 2:
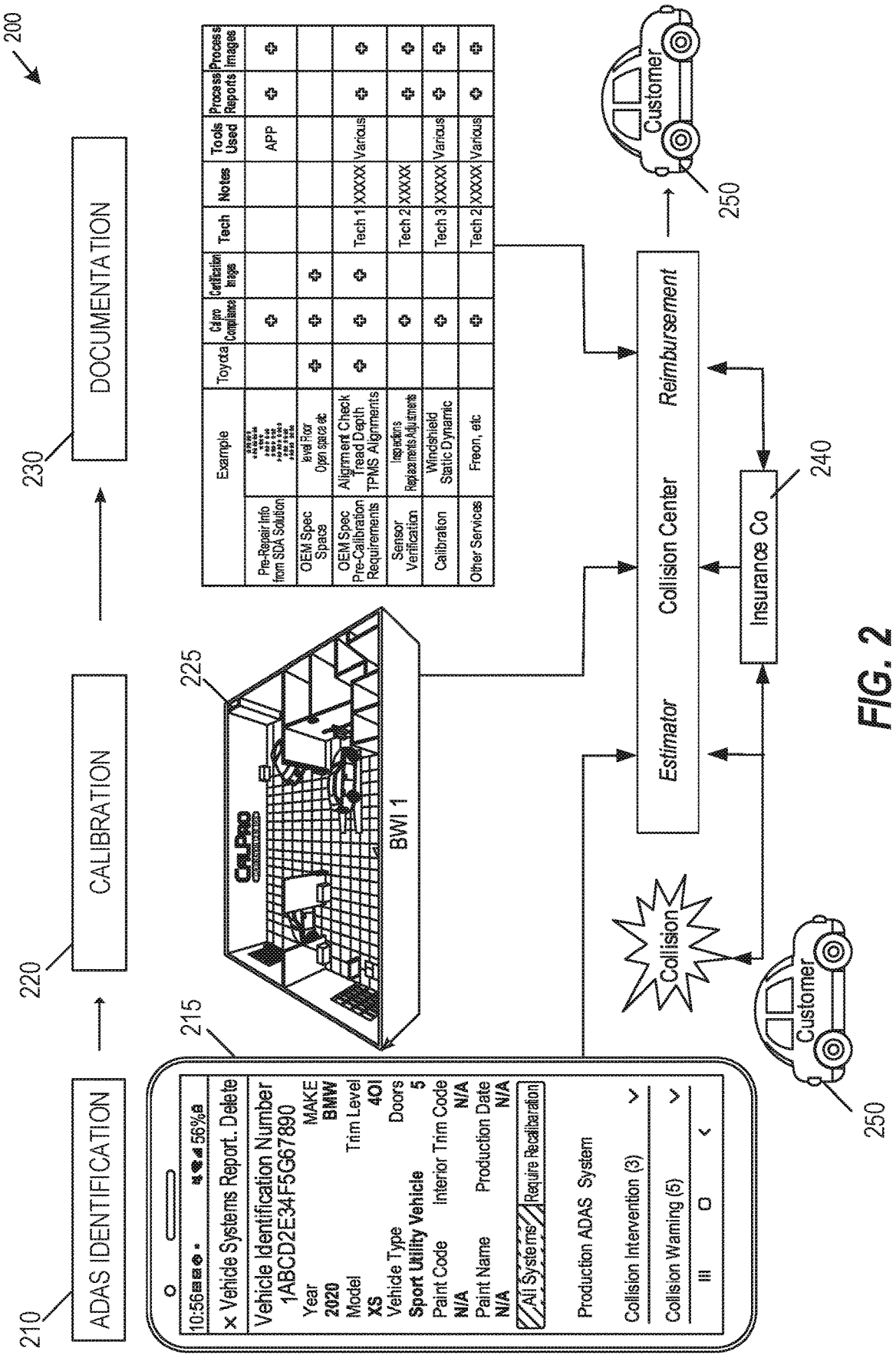
FIG. 2 is a diagram of vehicle safety system repair workflow, in accordance with at least one embodiment.

FIG. 2 is a diagram of a vehicle safety system repair workflow 200, in accordance with at least one embodiment. Workflow 200 may include ADAS, AEB, or other safety system identification 210, such as using user input on a smartphone 215 or another mobile electronic device. In an example, the safety system identification may include receiving a vehicle identification number (VIN). The VIN may be used to identify safety systems and safety features (e.g., safety sensors) based on general information about that vehicle make, year, and model, and specific information from the manufacturer or original seller of that particular vehicle. The identification of these safety systems and safety sensors may be based on retrieving a list of safety systems and safety sensors associated with the VIN from a safety system data store. The safety system data store may be stored and accessed locally, or may be retrieved remotely in batch or on-demand from a third-party safety system data store provider. The identification of these safety systems and safety sensors may include receiving sensor data available from the vehicle itself, such as sensor data provided by an on-board diagnostic (OBD) system. In some examples, the identification of these safety systems and safety sensors from the OBD system may not identify all vehicle safety systems and safety sensors, so retrieving information from a safety system data store may provide improved identification of these safety systems and safety sensors.

Workflow 200 may include safety system calibration 220, which may include vehicle safety sensor repair, replacement, or recalibration. The calibration 220 may be performed within a collision or calibration center 225. Workflow 200 may include generation of safety system calibration documentation 230. The documentation 230 may include a list of all vehicle safety sensors that were repaired, replaced, or recalibrated. The documentation 230 may also include images, video, sensor data, or other data showing the process or results of the vehicle safety sensor repair, replacement, or recalibration. The documentation 230 may also include a report of compliance with original equipment manufacturer (OEM) requirements or specifications, For example, an OEM compliance report may include a list of which vehicle sensors or other vehicle components are recommended to be replaced with OEM replacement parts, and may include a list of which of those vehicle sensors or other vehicle components were replaced using OEM parts.

An insurance company 240 may be involved at various steps within the workflow 200. In an example, an insurance company 240 may receive a collision report from a customer 250. The insurance company 240 may use information from the ADAS, AEB, or other safety system identification 210 to estimate the repair costs, such as to determine which safety systems they will pay to replace. The insurance company 240 may communicate with the collision or calibration center 225, such as to confirm which repairs are authorized. The insurance company 240 may also receive the documentation 230 to confirm the authorized systems have been repaired, and may provide that reimbursement to the collision or calibration center 225 or to the customer 250.

Figure 3:
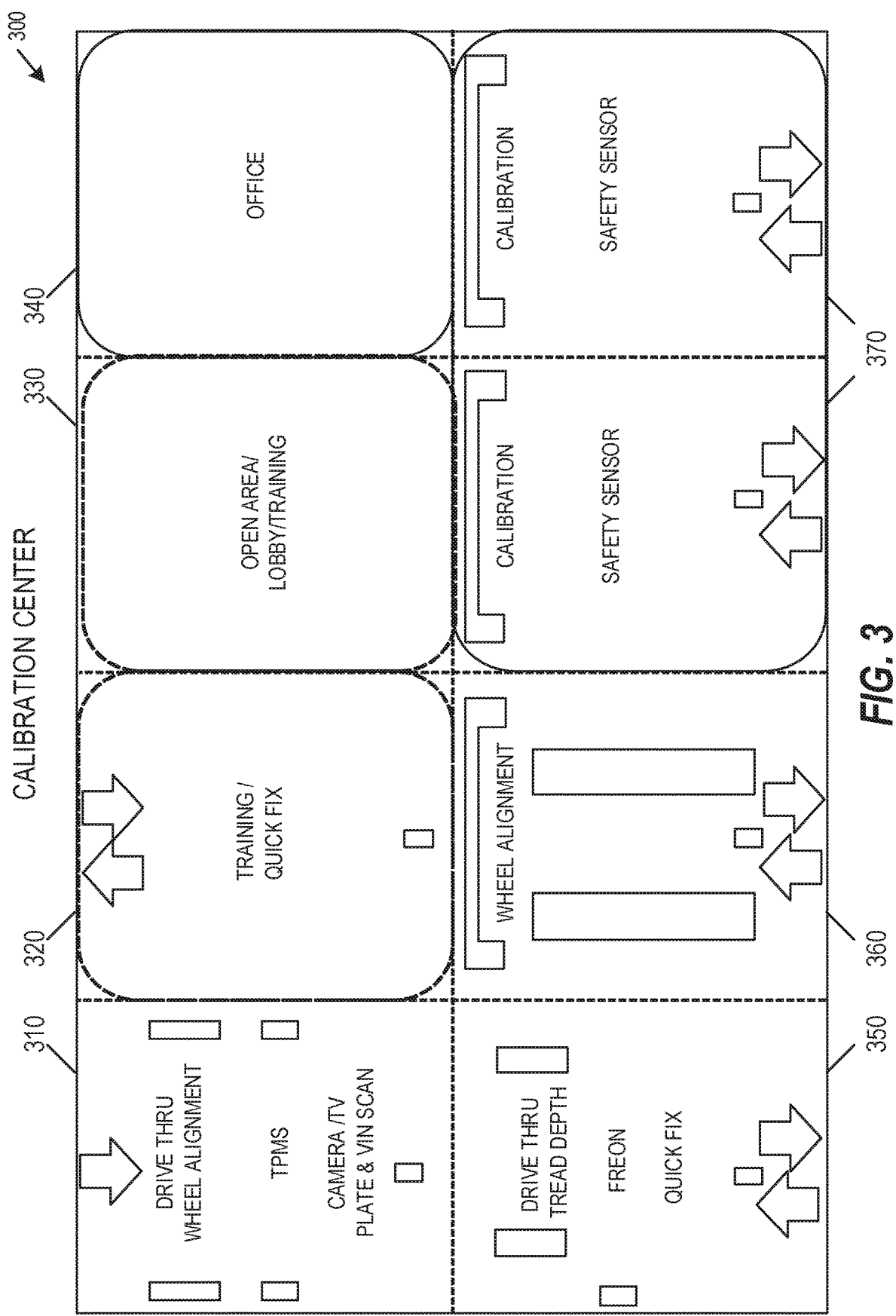
FIG. 3 is a diagram of a vehicle calibration center, in accordance with at least one embodiment.

FIG. 3 is a diagram of a vehicle calibration center 300, in accordance with at least one embodiment. Vehicle calibration center 300 may be used to calibrate one or more safety sensors on a vehicle. The safety sensors calibrated within vehicle calibration center 300 may be generic to all vehicles of a given make and model or may be specific to the individual vehicle.

Vehicle calibration center 300 may include an initial area 310 that provides a combination of a drive-through wheel alignment, a tire pressure monitoring system (TPMS) verification, and image acquisition of a license plate or VIN. In an example, the vehicle may be positioned in a fixed location for wheel alignment, where the TPMS verification may take place via a nearby TPMS radio-frequency (RF) monitoring system, and where image capture devices are positioned to capture and recognize the VIN or license plate. Vehicle calibration center 300 may include a training or quick fix area 320, which may include an area in which minor vehicle safety system repairs may take place. Vehicle calibration center 300 may include an open area 330 and an office 340, such as for sensor calibration training or vehicle sensor safety management.

Vehicle calibration center 300 may include a drive-through tread depth verification, a freon level verification, and a quick fix area 350. In an example, the tread depth verification may include an optical tread depth scanning device. Vehicle calibration center 300 may include a dedicated wheel alignment rack 360. The alignment rack 360 may provide wheel misalignment detection and measurement, and provide access to the vehicle suspension system to correct alignment camber, caster, and toe. Vehicle calibration center 300 may include one or more generic or vehicle-specific sensor calibration areas 370, such as to calibrate a camera sensor or other safety sensor.

Figure 4:
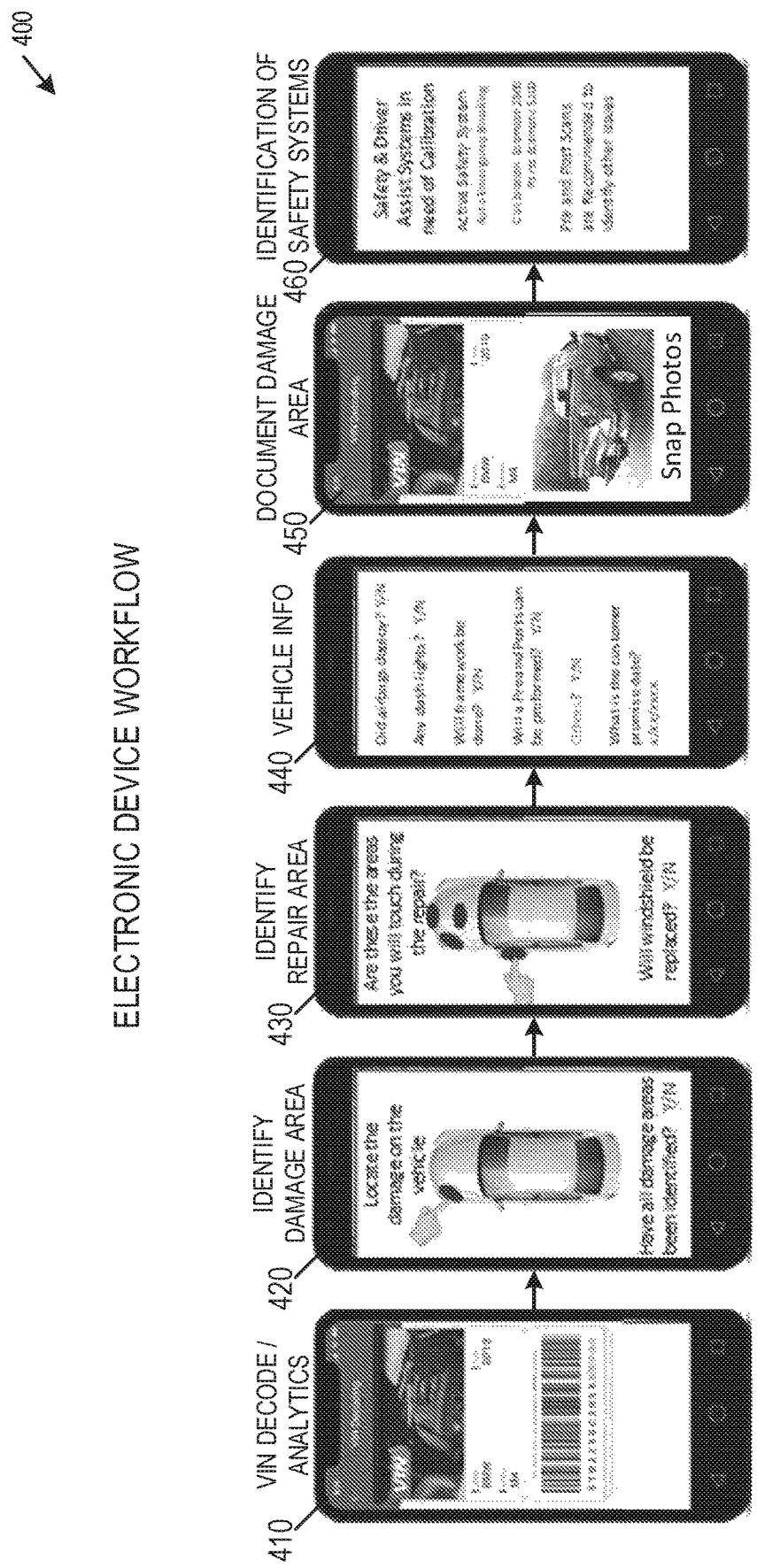
FIG. 4 is a diagram of vehicle safety system electronic device workflow, in accordance with at least one embodiment.

FIG. 4 is a diagram of vehicle safety system electronic device workflow 400, in accordance with at least one embodiment. Workflow 400 may generally include identification of a vehicle 410, such as through an image captured of a VIN or license plate. Workflow 400 may generally include identification of one or more damage areas of a vehicle to be repaired 420, which may be provided, for example, by a user input. Workflow 400 may generally include identification of one or more areas of a vehicle to be repaired or removed during vehicle repair 430, which may also be provided, for example, by a user input. In an example, damage to the front quarter panel of a vehicle may require removal of a front bumper, a hood, a door panel, or other component.

Workflow 400 may generally include receiving additional information about a vehicle 440. The information may be received, for example, in the form of one or more user question prompts. The information may include safety sensor information, such as identifying dashboard indicator lights or other information from inside the vehicle. Workflow 400 may generally include documenting additional vehicle information 450, such as capturing images to document vehicle damage areas. Workflow 400 may generally include identification 460 of one or more vehicle safety sensors that need repair, replacement, or recalibration. These sensors may be part of a vehicle AEB system, an ADAS, or other safety system. More specific details of the workflow 400 are described with respect to FIGS. 5-8.

Figure 5:
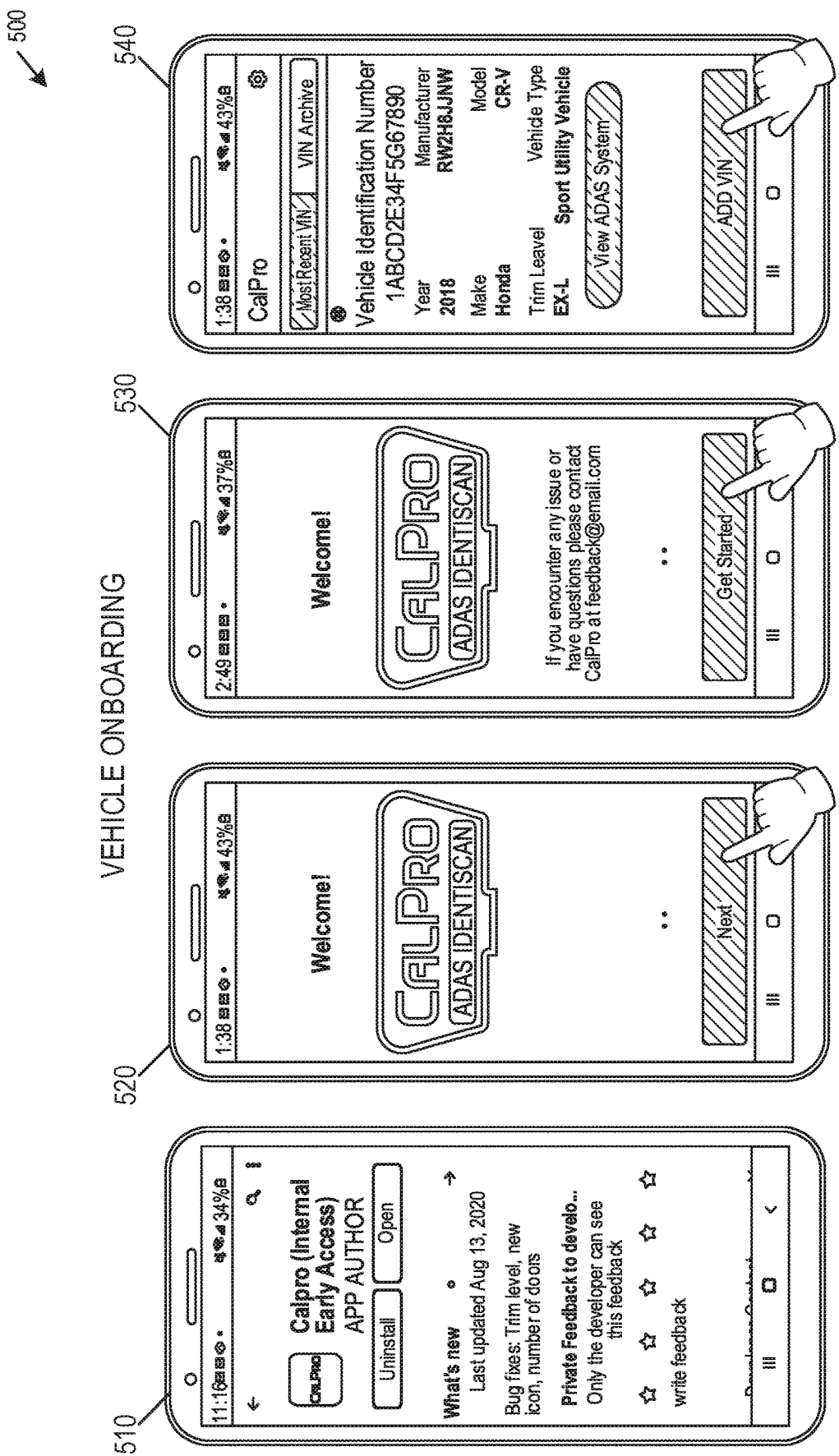
FIG. 5 is a diagram of vehicle onboarding, in accordance with at least one embodiment.

FIG. 5 is a diagram of vehicle onboarding 500, in accordance with at least one embodiment. Onboarding 500 may include installation of an application 510 on an electronic device (e.g., a mobile electronic device), which may provide various information about the application status or recent changes. Onboarding 500 may include displaying initial welcome information 520 or contact information 530. Onboarding 500 may include confirming or decoding a VIN 540, such as shown in FIG. 6.

Figure 6:
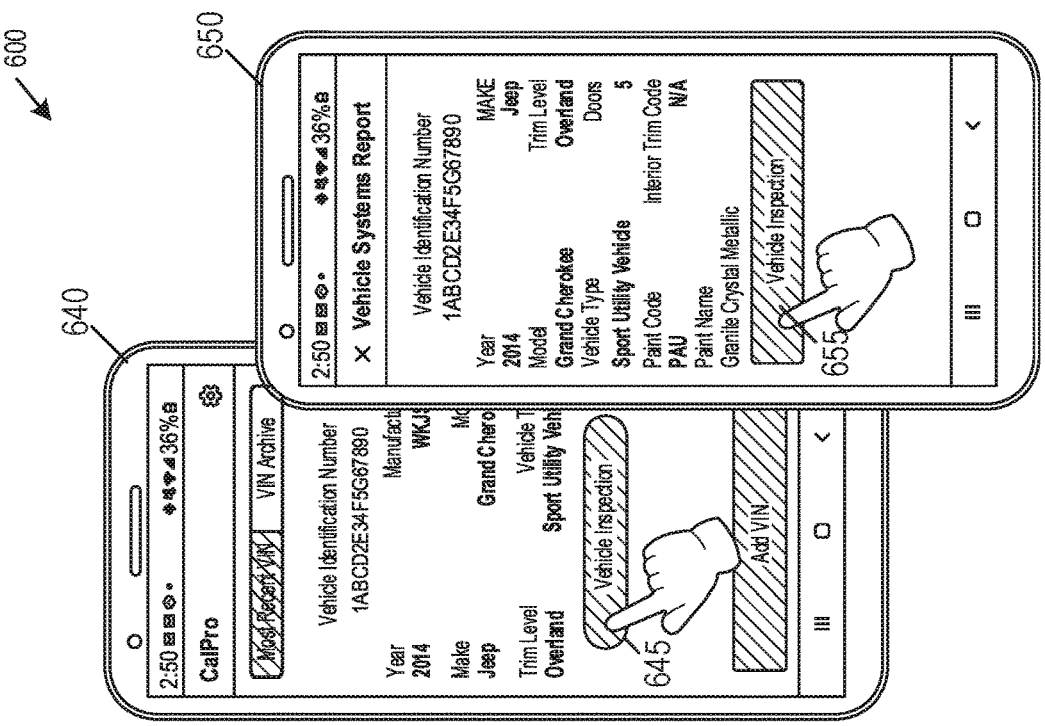
FIG. 6 is a diagram of VIN decoding, in accordance with at least one embodiment.
Figure 6:
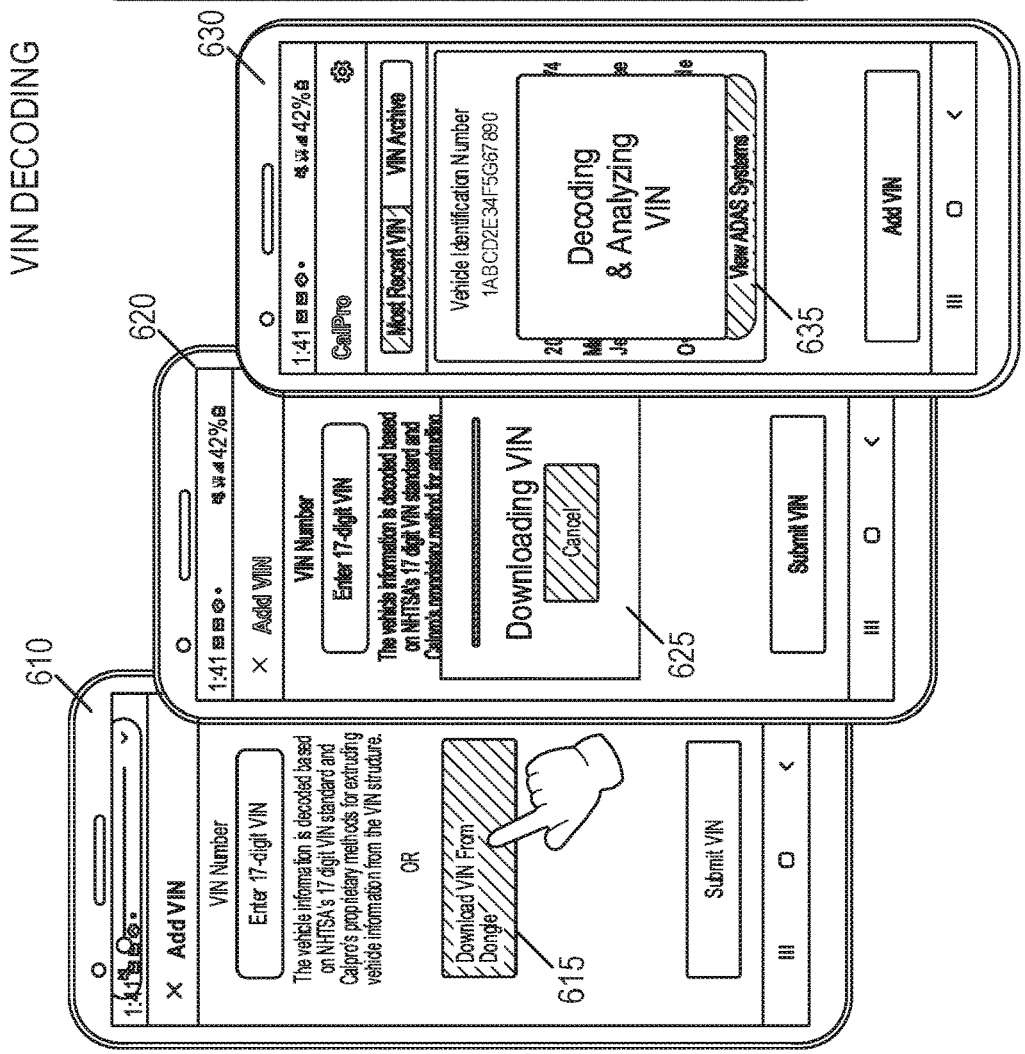

FIG. 6 is a diagram of VIN decoding 600, in accordance with at least one embodiment. VIN decoding 600 may include capturing the VIN, such using an OBD dongle that plugs into a vehicle OBDII port and provides OEM specifications and other vehicle information. An electronic device (e.g., smartphone, tablet, desktop computer) may present a VIN download prompt 610, which may include a button 615 for a user to initiate a download of the VIN from the dongle. The device may present a downloading screen 620 to indicate the progress 625 of downloading the VIN from the dongle, and may present a decoding and analyzing screen 630 to indicate the progress of decoding and analyzing the VIN 635. VIN decoding 600 may also include scanning a barcode or QR code to identify a VIN, capturing an image of a VIN number and applying optical character recognition, or manual entry of a VIN.

The VIN may be used to identify safety systems, safety sensors, and other vehicle information associated with the VIN from a safety system data store. The safety system data store may be stored and accessed locally, or may be retrieved remotely in batch or on-demand from a third-party safety system data store provider. In an example, the safety system data store includes a database of vehicles that associate each VIN with vehicle build sheet information, including vehicle safety systems and safety sensors. In addition to information retrieved from the safety systems data store based on the VIN, additional information about safety systems and safety sensors may be based on data received from the vehicle itself, such as sensor data provided by the OBD system. Each VIN and corresponding retrieved vehicle information may be stored locally on the electronic device, and may be accessed through a VIN archive.

The VIN decoding 600 may provide a basic information screen 640, which may provide generalized information about the vehicle year, manufacturer, make, model, trim, and type. The VIN decoding 600 may provide a detailed information screen 650, which may provide additional details about the vehicle. In an example, the detailed information is based on a corresponding vehicle build sheet, and may further indicate a paint code, a trim code, a paint name, a list of safety sensors, or other information not provided in a basic information screen 640. The basic information and detailed information may be displayed to enable a user to verify that the correct vehicle has been identified. In an example, a user may identify the vehicle model does not match the vehicle, which may prompt the user to verify the VIN or use another VIN input method. Each of the basic information screen 640 and the detailed information screen 650 may include a vehicle inspection prompt 645 or 655 for the user to begin vehicle inspection.

Figure 7:
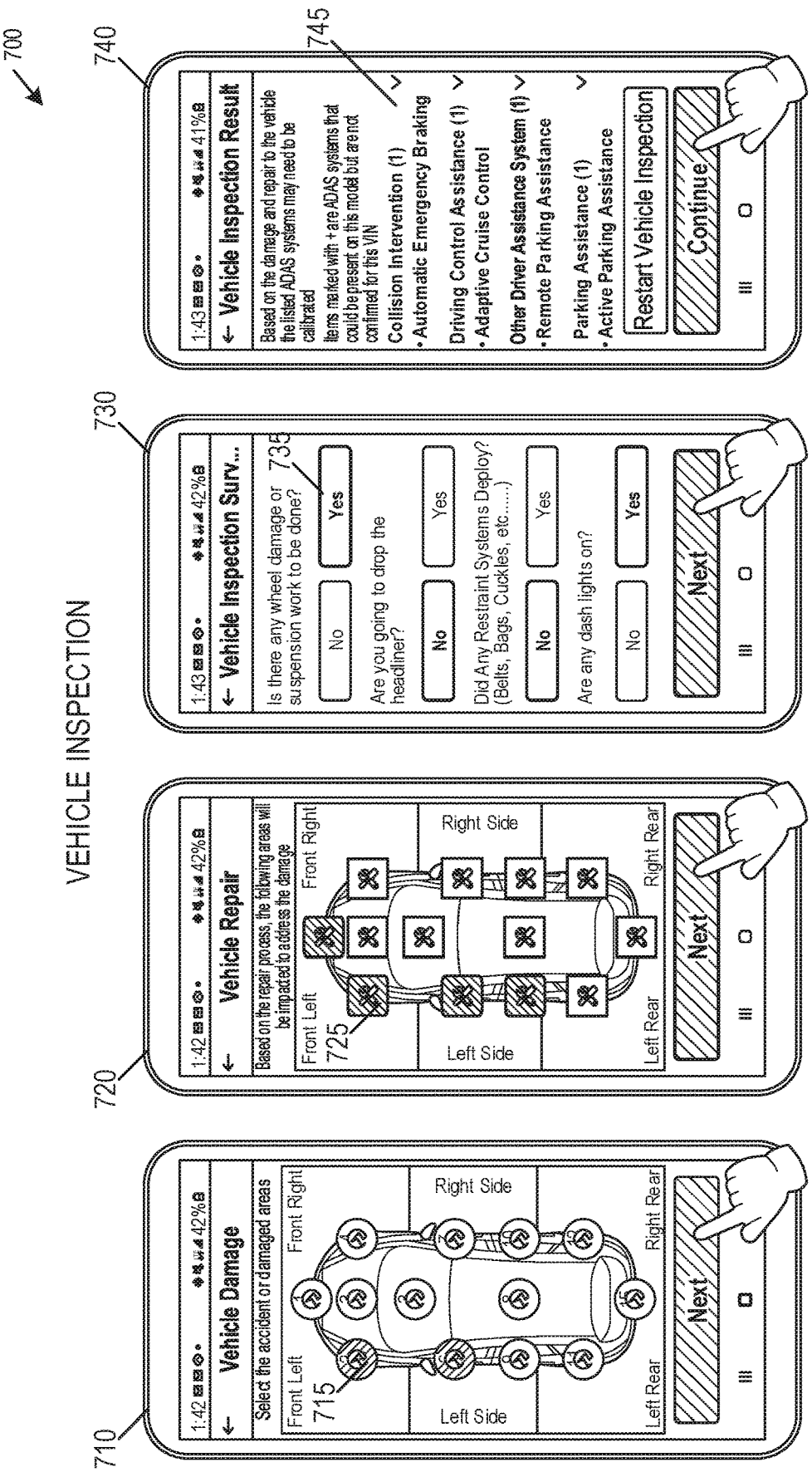
FIG. 7 is a diagram of vehicle inspection, in accordance with at least one embodiment.

FIG. 7 is a diagram of vehicle inspection 700, in accordance with at least one embodiment. Vehicle inspection 700 may include a damage area identification screen 710 where a user may identify one or more damaged vehicle areas, such as through a user damage indication 715 received on an electronic device. In an example, a stock image of a generic vehicle type (e.g., car, truck, van, SUV) or a generic or specific image corresponding to the vehicle identified by the VIN may be presented on a display screen of the electronic device, and a user may tap on one or more areas of the image to indicate one or more damage areas. In another example, a generic or vehicle-specific list of areas may be presented on the display screen, and a user may select one or more damage areas from the list. A combination of images and a damage area list may be presented to the user in some examples. Each vehicle type may have associated damage areas that may be identified, including vehicle-agnostic areas common to all vehicles (e.g., vehicle hood, vehicle doors), and including vehicle-specific areas that are not common to all vehicles (e.g., truck bed, car trunk).

The damage area identification screen 710 may be used to determine potential work and sensors that may need to be calibrated or replaced, such as by comparing the identified damage areas to OEM specifications for the vehicle safety sensors in the identified areas. This determination may be performed on the mobile electronic device or on a remote device. In an example, input received at the damage area identification screen 710 may be sent to a remote server, and that the determination of potential work and sensors that may need to be calibrated or replaced may take place at either or both the mobile electronic device or on the remote server.

Vehicle inspection 700 may include a repair area identification screen 720. The repair area identification screen 720 may be used to identify one or more areas of a vehicle that need to be repaired, such as through a user repair indication 725 received on an electronic device. The repair area identification screen 720 may be displayed following completion of the damage area identification screen 710. In an example, the repair area identification screen 720 may be displayed without requiring input on the damage area identification screen 710, such as when the mechanic has already determined the areas requiring repair. The determination of potential work and sensors that may need to be calibrated or replaced may be based only on information received at the damage area identification screen 710, based only on information received at the repair area identification screen 720, or based on a combination of information received at the damage area identification screen 710 and at the repair area identification screen 720.

In an example, a stock image of a generic vehicle type (e.g., car, truck, van, SUV) or a generic or specific image corresponding to the vehicle identified by VIN may be presented on a display screen of the electronic device, and a user may tap on one or more areas of the image to indicate one or more repair areas. In another example, a generic or vehicle-specific list of areas may be presented on the display screen, and a user may select one or more repair areas from the list. A combination of images and a damage area list may be presented to the user in some examples. Each vehicle type may have associated repair areas that may be identified, including vehicle-agnostic areas (e.g., vehicle hood, vehicle doors), and including vehicle-specific areas (e.g., truck bed, car trunk).

In some examples, one or more repair areas may be identified automatically based on the damage area(s) identified at 710. The automatically identified areas may be based on a mapping of generalized damage areas, such as damage areas identified by the user damage indication 715. In an example, information from the damage area identification screen 710 may be sent to a remote server, which may provide an initial identification of damage areas. In another example, a mapping of safety systems affected by vehicle damage areas may be downloaded from a remote server, such as during VIN decoding 600.

In some examples, one or more repair areas may be identified automatically based on the damage area(s) identified at 710, and may be modified based on user input. In some examples, the areas to be repaired may include more areas than indicated in the damage area identification screen 710. For example, damage to the front quarter panel of a vehicle may require removal of a front bumper, a hood, a door panel, or other component. The repair area identification 720 may include prompting a user to identify repair areas or to confirm or modify repair areas automatically identified based on the damage area identification screen 710.

Vehicle inspection 700 may include a vehicle inspection survey (e.g., questionnaire) 730. The vehicle inspection survey 730 may include prompting a user with one or more questions regarding the vehicle. The received information may include safety sensor information, such as identifying dashboard indicator lights or other information from inside the vehicle. In some examples, the dashboard indicator lights or vehicle system display (e.g., central console display) may indicate deployment and location of one or more airbags. The information may be used to identify additional vehicle safety sensors that need repair, replacement, recalibration, or further investigation. The information may also indicate calibration status, calibration setup, or requirements to calibrate a vehicle. For example, an indication of airbag deployment may provide instructions to replace an airbag and one or more vehicle collision sensors associated with deployment of that airbag. This information may be used to ensure the certification and environment are setup correctly, and may be used to understand the damage to the vehicle and other considerations that may affect how the vehicle will be calibrated.

In an embodiment, vehicle safety systems may be determined automatically based on safety system identification through data analytics or artificial intelligence (AI) (e.g., machine learning). The automated identification may include mapping a vehicle safety system data set to one or more locations on a vehicle, such as those identified at 710 or 720. In an example, damage and repair information identified at 710 or 720 is sent to a remote server, the automated identification is performed at a remote server to map the areas identified at 710 or 720 to corresponding safety systems for that vehicle. In another example, information from the VIN decoding 600 is sent to a remote server, which provides a mapping of vehicle regions to corresponding safety systems that need repair and calibration. The remote server may perform this automated identification based on generic or specific information about that vehicle. In an example, generic automated identification includes identifying one or more safety systems within a data set that is generic to a vehicle make, model, and year. In another example, specific automated identification includes identifying a data set that is specific to a vehicle, such as information provided by a manufacturer or original seller of that specific vehicle. The automated identification may include identification of one or more vehicle safety sensor groups. In an example, sensor groups may be identified by vehicle trim levels, such as advanced technology package sensors located on a front bumper, comfort and convenience sensors located on a front quarter panel, safety and driver assist sensors located within a side mirror, and other vehicle safety sensors. The automated identification may include identification of one or more vehicle safety sensors on the vehicle. In an example, the identification of the vehicle safety sensors may be based on information that is specific to that individual vehicle, such as by retrieving a list of safety sensors that are identified on the vehicle build sheet. The automated identification may include identification of vehicle damage, repair, or calibration areas based on a received repair document. In an example, a damage estimate document or repair order may be generated by a vehicle repair business or by an insurance estimator, and the automated identification may identify damage areas, repair areas, or calibration areas based on the received document. In many cases, the damage estimate document or repair order may identify damaged areas but not identify the safety systems that must also be recalibrated based on the damaged areas. The identification of calibration areas may improve the safety of the vehicle and improve the reliability of the cost estimate for repair and calibration. In a machine learning example, a machine learning model may be trained based on one or more of the damage areas, repair areas, repair documents, or other inputs, and the trained ML model may be used to identify safety systems to be repaired.

Vehicle inspection 700 may include generation of a vehicle inspection result screen 740. The inspection result screen 740 may include a list of safety systems to be repaired and calibrated, such as one or more safety system names and safety system subgroup names 745. The safety systems information may be generic to a vehicle make, model, and year, or may be specific to information provided by a manufacturer or original seller of that specific vehicle. The inspection results may be based on information received in the damage area identification screen 710, the repair area identification screen 720, the vehicle inspection survey 730, or the automated identification described above. The vehicle inspection result screen 740 may be used to generate a vehicle safety systems report, such as shown in FIG. 8.

Figure 8:
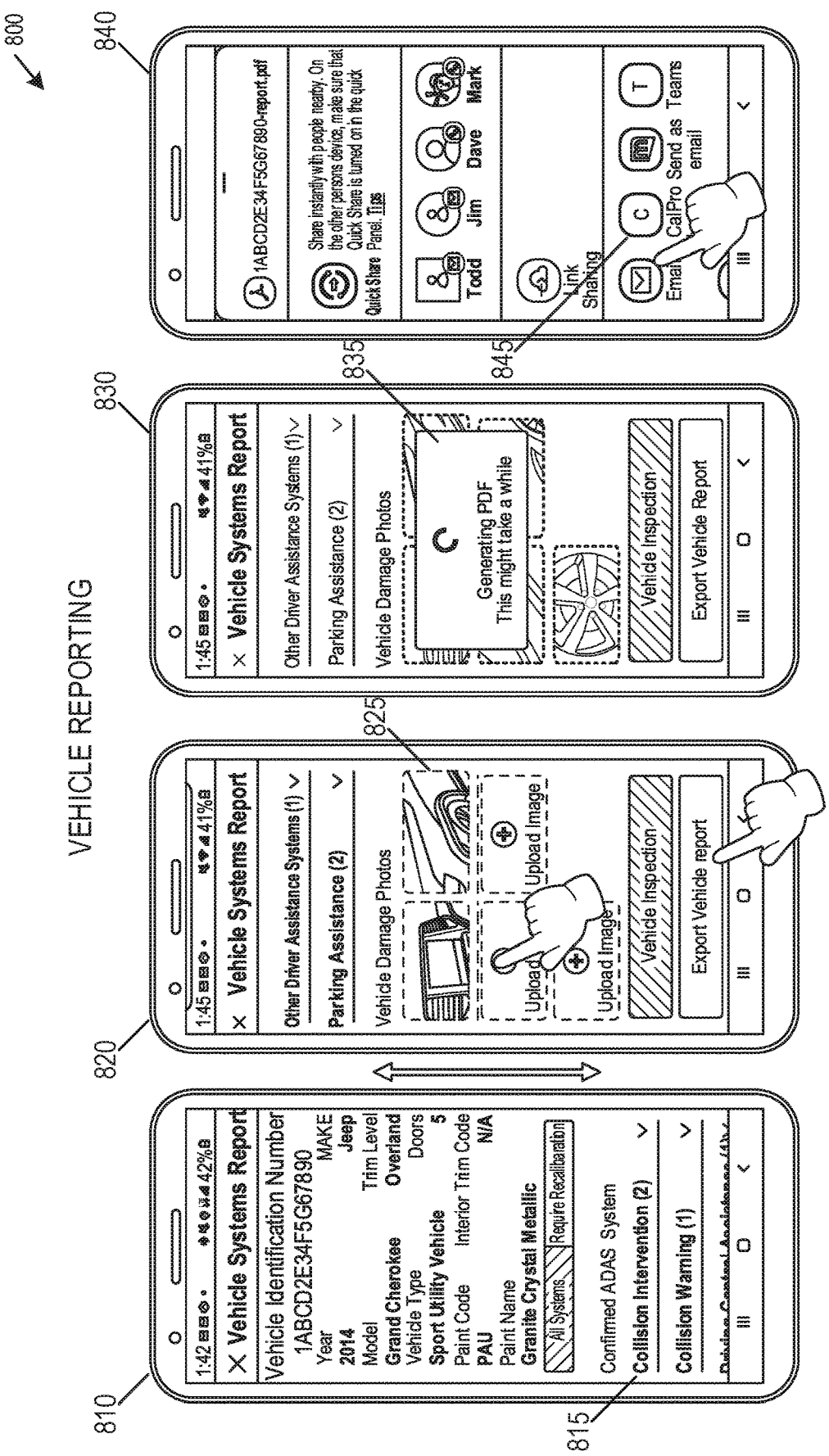
FIG. 8 is a diagram of a vehicle safety systems reporting, in accordance with at least one embodiment.

FIG. 8 is a diagram of vehicle safety systems reporting 800, in accordance with at least one embodiment. The vehicle safety systems reporting 800 may include generating or sending one or more vehicle safety sensor reports. In an example, an initial report may be generated to identify all vehicle safety systems that might be installed on the vehicle. The initial report may include identification of safety driver assist systems, fault codes, and recommended scans to verify the functionality of the systems. In an example, a detailed electronic report 810 may be generated to identify which of the vehicle safety systems are currently installed on the vehicle. The detailed electronic report 810 may be displayed on a mobile electronic device, and may provide a list of one or more safety system entries 815 that may be expanded for more details. This detailed electronic report 810 may include estimates for repair, replacement, and recalibration of the identified vehicle safety systems, identification of fault codes, and recommended scans to verify the functionality of the systems. This detailed electronic report 810 may include OEM parts replacement specifications or recommendations that may not be part of the safety system. In an example, an OEM bumper may be required to ensure correct repair and calibration of a bumper safety camera, and the detailed report may indicate compliance with safety-related OEM requirement.

The vehicle safety systems reporting 800 may include capturing vehicle damage images 820 to document vehicle damage areas. An image capture device may be used to capture images of a vehicle from various perspectives. An electronic device may guide a user through the capturing of a series of images of a vehicle. In an example, to assist in capturing a preferred vehicle viewpoint (e.g., perspective view of the right left quarter panel 825), the mobile electronic device may display an outline of the portion of the vehicle to be photographed. The captured images of vehicle damage areas may be used to confirm or identify vehicle damage areas. In an example, a captured image may be compared against an image of an undamaged vehicle of the same body style to identify misshapen, missing, or otherwise damaged areas. In an example, machine learning may be used to identify vehicle damage areas based on the captured images of vehicle damage areas. The display of a vehicle outline or other vehicle structure on the device screen may be used to improve the comparison between the captured image and an image of an undamaged vehicle.

The vehicle safety systems reporting 800 may include generation of an electronic report 830 identifying vehicle damage, repair, and calibration. The electronic report 830 may include information from the detailed report 810, from the captured vehicle damage images 820, or other information. The vehicle safety systems reporting 800 may include prompting a user 840 to send the electronic report 830 to a third party, such as to an insurance company. The electronic report 830 may be sent as an electronic document 835, such as a PDF or a Word document. The data within the electronic report 830 may be sent in a computer-readable format (e.g., comma-separated values), which may be used by a calibration center system 845 to import the information without having to extract information from an electronic document. In an example, the data within the electronic report 830 may be encoded within the electronic document, such as encoding the data as metadata within the electronic document.

Figure 9:
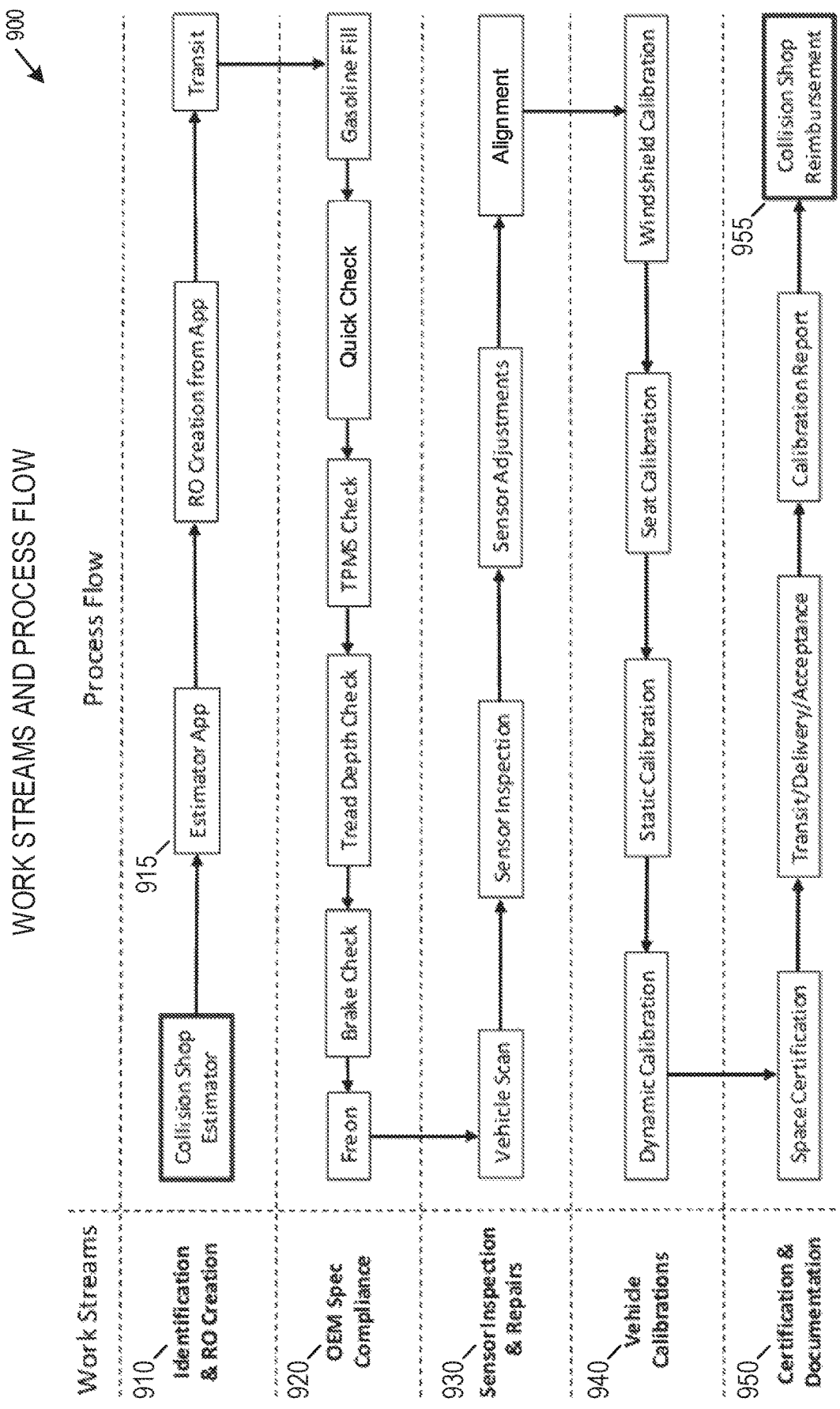
FIG. 9 is a diagram of work streams and a process flows, in accordance with at least one embodiment.

FIG. 9 is a diagram of work streams and a process flow 900, in accordance with at least one embodiment. The work streams and a process flow 900 may be used by a calibration center to process a damaged vehicle from vehicle intake to insurance reimbursement 955. The work streams may include identification and repair order (RO) creation 910, which may include associated process flows of a collision shop estimator, an estimator application, a RO creation from the application, and transit. The estimator application 915 may correspond with vehicle damage and repair steps described above, such as vehicle onboarding 500, VIN decoding 600, vehicle inspection 700, and vehicle safety systems reporting 800. In an example, the vehicle safety systems reporting 800 may be used to generate the repair order to indicate which vehicle systems and sensors need repair or calibration.

The work streams may include OEM specification compliance 920, which may include associated process flows of a gasoline fill, a quick check, a TPMS check, a tread depth check, a brake check, and a freon check. The work streams may include sensor inspection and repairs 930, which may include associated process flows of a vehicle scan, a sensor inspection, a sensor adjustment, and an alignment. The work streams may include vehicle calibrations 940, which may include associated process flows of a windshield calibration, a seat calibration, a static vehicle calibration (e.g., vehicle is calibrated while immobile), and dynamic vehicle calibration (e.g., vehicle is calibrated while being driven). The work streams may include certification and documentation 950, which may include associated process flows of a vehicle safety system calibration space certification, a transit or delivery acceptance, a calibration report, and a collision shop reimbursement.

Figure 10:
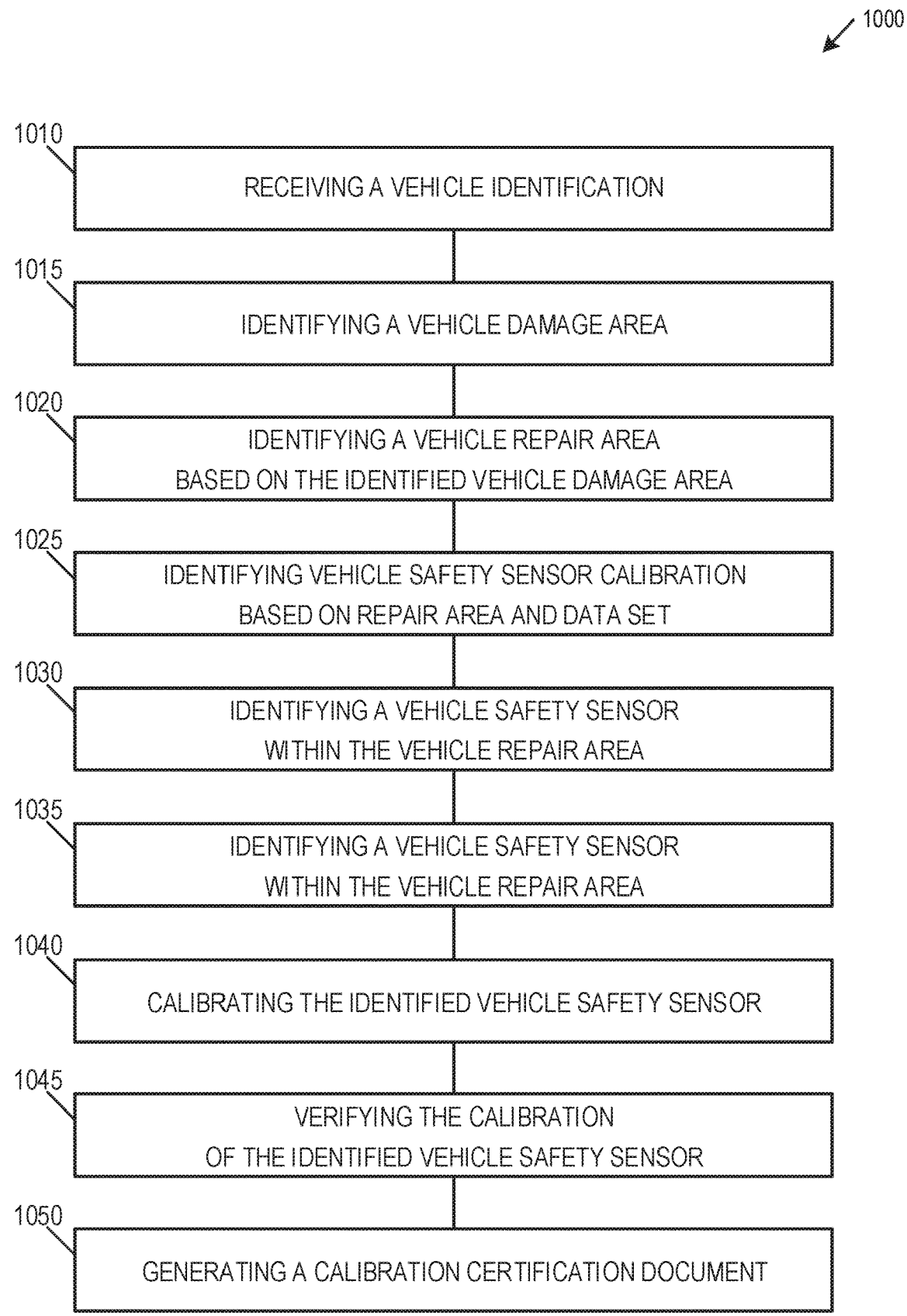
FIG. 10 is a diagram of a vehicle safety sensor identification and calibration method, in accordance with at least one embodiment.

FIG. 10 is a diagram of a vehicle safety sensor identification and calibration method 1000, in accordance with at least one embodiment. Method 1000 may include receiving a vehicle identification 1010. The vehicle identification 1010 may include connecting an electronic vehicle self-diagnostic device to a vehicle and receiving a plurality of vehicle self-diagnostic data from the vehicle. The plurality of vehicle self-diagnostic data may include the vehicle identification and a plurality of vehicle sensor data. The identification of the vehicle safety sensor calibration may be further based on the plurality of vehicle sensor data. In an example, the vehicle identification data may include retrieving a VIN, and the stored vehicle safety sensor data set may include a list of vehicle safety sensors specific to the VIN.

Method 1000 may include identifying a vehicle damage area 1015. The identification of a vehicle damage area 1015 may include receiving a vehicle damage image and comparing the vehicle damage image to a stored undamaged vehicle image. The identification of a vehicle damage area 1015 may be based on the comparison of the vehicle damage image to the stored undamaged vehicle image. This may include displaying a generic vehicle image to a user and receiving a damage indication from the user. The identification of a vehicle damage area 1015 may be based on the damage indication received from the user.

Method 1000 may include receiving identifying a vehicle repair area based on the identified vehicle damage area 1020 or user input, and identifying a vehicle safety sensor calibration based on the identified vehicle repair area and a stored vehicle safety sensor data set 1025, as described above with respect to FIGS. 5-7.

Method 1000 may include identifying a vehicle safety sensor within the vehicle damage area or vehicle repair area 1030. The vehicle repair area may include at least one undamaged vehicle area that requires a vehicle part removal during a repair to the vehicle damage area. In some examples, as mentioned above, the identified vehicle safety sensor may be outside the vehicle damage area but within the vehicle repair area. The identified vehicle safety sensor may require calibration in response to a modification to the vehicle repair area.

Method 1000 may include generating an electronic report 1035, The report may identify vehicle damage, repair, and calibration. The report may include information from the detailed report 810, from the captured vehicle damage images 820, or other information. The report may include a list of damaged systems, systems to be repaired, systems to be calibrated, instructions to repair or calibrate, or other information.

Method 1000 may include calibrating the identified vehicle safety sensor 1040 or verifying the calibration of the identified vehicle safety sensor 1045. The vehicle safety sensor may be a part of at least one of an automatic emergency braking (AEB) system and an automated driver assistance system (ADAS).

Method 1000 may include generating a calibration certification document 1050. The calibration certification document may identify a plurality of vehicle sensor calibration test results and information about a vehicle calibration testing environment. The calibration certification document may also indicate compliance with OEM requirements or specifications, such as a list of which of those vehicle sensors or other vehicle components were replaced using OEM parts.

Figure 11:
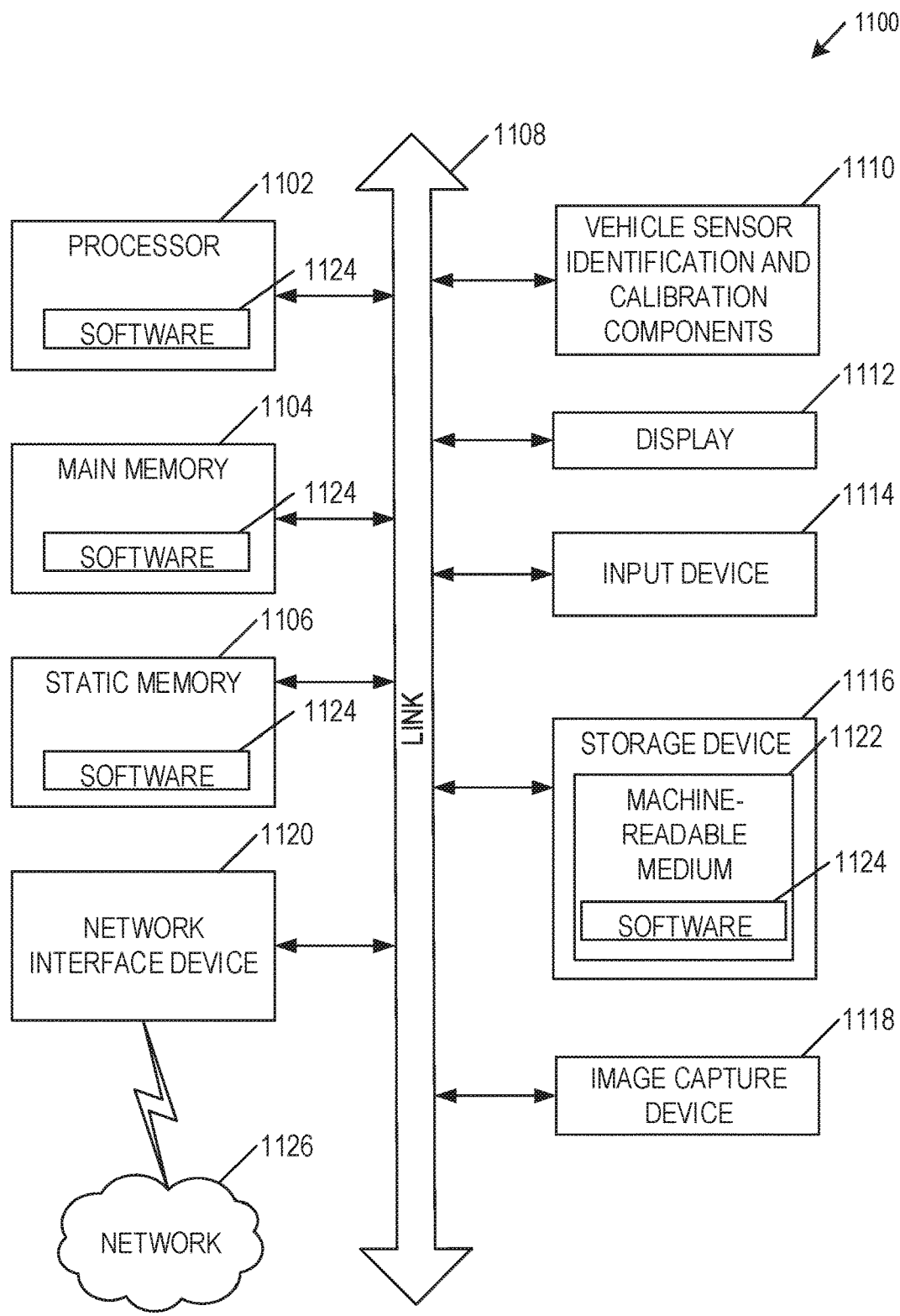
FIG. 11 is a block diagram illustrating a vehicle safety sensor identification and calibration system in an example form of an electronic device 1100, within which a set or sequence of instructions may be executed to cause the machine to perform any one of the methodologies discussed herein, according to an example embodiment.

FIG. 11 is a block diagram illustrating a vehicle safety sensor identification and calibration system in an example form of an electronic device 1100, within which a set or sequence of instructions may be executed to cause the machine to perform any one of the methodologies discussed herein, according to an example embodiment. Electronic device 1100 may represent a single device or a system of multiple devices combined to provide vehicle safety sensor identification and calibration. In alternative embodiments, the electronic device 1100 operates as a standalone device or may be connected (e.g., networked) to other machines. In a networked deployment, the electronic device 1100 may operate in the capacity of either a server or a client machine in server-client network environments, or it may act as a peer machine in peer-to-peer (or distributed) network environments. The electronic device 1100 may be implemented on a System-on-a-Chip (SoC), a System-in-a-Package (SiP), an integrated circuit (IC), a portable electronic device, a personal computer (PC), a tablet PC, a hybrid tablet, a personal digital assistant (PDA), a mobile telephone, a server computer, or any electronic device 1100 capable of executing instructions (sequential or otherwise) that specify actions to be taken by that machine to detect a user input. Further, while only a single electronic device 1100 is illustrated, the terms "machine" or "electronic device" shall also be taken to include any collection of machines or devices that individually or jointly execute a set (or multiple sets) of instructions to perform any one or more of the methodologies discussed herein. Similarly, the term "processing circuitry" shall be taken to include any set of one or more machines that are controlled by or operated by a processor (e.g., a computer) to execute instructions, individually or jointly, to perform any one or more of the methodologies discussed herein.

Example electronic device 1100 includes at least one processor 1102 (e.g., a central processing unit (CPU), a graphics processing unit (GPU), processor cores, compute nodes, etc.), a main memory 1104 and a static memory 1106, which communicate with each other via a link 1108 (e.g., bus). The main memory 1104 or static memory 1106 may be used to store information used to identify or calibrate vehicle safety sensors.

The electronic device 1100 may include one or more vehicle safety sensor identification and calibration components 1110, which may provide various data to perform the vehicle safety sensor identification and calibration processes described above. The components 1110 may include an image capture device, an OBD reading device, or other vehicle sensor identification or calibration component. The components 1110 may include processing specific to vehicle safety sensor identification, such as a GPU dedicated to visually identifying a vehicle and vehicle safety systems. In an embodiment, certain processing may be performed by one or both of the processor 1102 and the components 1110. Certain processing may be performed only by the components 1110, such as processing performed on a mobile electronic device.

The electronic device 1100 may further include a display unit 1112, where the display unit 1112 may include a single component that provides a user-readable display and a protective layer, or another display type. The electronic device 1100 may further include an input device 1114, such as a pushbutton, a keyboard, or a user interface (UI) navigation device (e.g., a mouse or touch-sensitive input). In an example, the display 1112 and the input device 1114 may be the same device, such as a touch-sensitive display device. The electronic device 1100 may additionally include a storage device 1116, such as a drive unit. The electronic device 1100 may additionally include one or more image capture devices 1118 to capture images as described above. The electronic device 1100 may additionally include a network interface device 1120, and one or more additional sensors (not shown).

The storage device 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104, static memory 1106, component 1110, or within the processor 1102 during execution thereof by the electronic device 1100. The main memory 1104, static memory 1106, component 1110, and the processor 1102 may also include machine-readable media.

While the machine-readable medium 1122 is illustrated in an example embodiment to be a single medium, the term "machine-readable medium" may include a single medium or multiple media (e.g., a centralized or distributed database, or associated caches and servers) that store the one or more instructions 1124. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1124 may further be transmitted or received over a communications network 1126 using a transmission medium via the network interface device 1120 utilizing any one of a number of well-known transfer protocols (e.g., HTTP). Examples of communication networks include a local area network (LAN), a wide area network (WAN), the Internet, mobile telephone networks, and wireless data networks (e.g., Wi-Fi, NFC, Bluetooth, Bluetooth LE, 3G, 5G LTE/LTE-A, WiMAX networks, etc.). The term "transmission medium" shall be taken to include any intangible medium that is capable of storing, encoding, or carrying instructions for execution by the machine, and includes digital or analog communications signals or other intangible medium to facilitate communication of such software.

To better illustrate the method and apparatuses disclosed herein, a non-limiting list of embodiments is provided here.

Example 1 is a method for identifying vehicle safety feature calibration, the method comprising: receiving an identification of a vehicle; identifying a stored vehicle safety feature data set based on the identification of the vehicle; receiving an identification of a vehicle repair area; and identifying a vehicle safety feature calibration based on the identified vehicle repair area and the stored vehicle safety feature data set.

In Example 2, the subject matter of Example 1 includes, wherein the stored vehicle safety feature data set includes a stored vehicle safety sensor data set.

In Example 3, the subject matter of Examples 1-2 includes, wherein the identification of the vehicle includes a vehicle identification number (VIN), and wherein the stored vehicle safety feature data set is identified based on the VIN.

In Example 4, the subject matter of Example 3 includes, connecting an electronic device to an on-board diagnostic device connected to the vehicle; and retrieving the VIN at the electronic device via the on-board diagnostic device.

In Example 5, the subject matter of Example 4 includes, retrieving on-board diagnostic information at the electronic device via the on-board diagnostic device connected to the vehicle, wherein the identification of the vehicle safety feature calibration is further based on the retrieved on-board diagnostic information.

In Example 6, the subject matter of Examples 1-5 includes, generating a calibration verification, the calibration verification confirming a performance of the vehicle safety feature calibration.

In Example 7, the subject matter of Example 6 includes, generating a calibration certification document, wherein: the calibration certification document includes the generated calibration verification; and the calibration certification document identifies a plurality of vehicle sensor calibration test results and a vehicle calibration testing environment.

In Example 8, the subject matter of Examples 6-7 includes, wherein the generation of the calibration verification includes a confirmation with an original equipment manufacturer (OEM) calibration specification.

In Example 9, the subject matter of Examples 1-8 includes, identifying a vehicle damage area, wherein the identification of the vehicle repair area is at least partially based on the identified vehicle damage area.

In Example 10, the subject matter of Example 9 includes, wherein: the identified vehicle safety feature calibration is outside the vehicle damage area but within the vehicle repair area; and the identified vehicle safety feature calibration requires calibration in response to a modification to the vehicle repair area.

In Example 11, the subject matter of Examples 1-10 includes, identifying a vehicle safety feature within the vehicle repair area, wherein the identified vehicle safety feature requires calibration in response to a modification to the vehicle repair area.

In Example 12, the subject matter of Example 11 includes, generating calibration instructions for calibrating the identified vehicle safety feature; and outputting the calibration instructions for display.

In Example 13, the subject matter of Examples 11-12 includes, calibrating the identified vehicle safety feature; and verifying the calibration of the identified vehicle safety feature.

In Example 14, the subject matter of Examples 11-13 includes, wherein the vehicle safety feature is part of at least one of an automatic emergency braking (AEB) system and an automated driver assistance system (ADAS).

In Example 15, the subject matter of Examples 9-14 includes, wherein the vehicle repair area includes at least one undamaged vehicle area that requires a vehicle part adjustment during a repair to the vehicle damage area.

In Example 16, the subject matter of Example 15 includes, wherein the vehicle part adjustment includes a vehicle wheel alignment, the method further including: generating alignment instructions for the vehicle wheel alignment; and outputting the alignment instructions for display.

In Example 17, the subject matter of Examples 1-16 includes, receiving a vehicle damage image; and comparing the vehicle damage image to a stored undamaged vehicle image, wherein the identification of the vehicle damage area is based on the comparison of the vehicle damage image to the stored undamaged vehicle image.

In Example 18, the subject matter of Examples 9-17 includes, receiving a damage indication from a user, wherein the identification of the vehicle damage area is based on the damage indication received from the user.

In Example 19, the subject matter of Example 18 includes, displaying a vehicle image to the user; and receiving the damage indication on the displayed vehicle image from the user, wherein an identification of the vehicle damage area is based on the damage indication received from the user.

In Example 20, the subject matter of Examples 18-19 includes, displaying a list of potential vehicle damage areas to the user; and receiving the damage indication from the user based on a user selection of one or more items within the list of potential vehicle damage areas, wherein an identification of the vehicle damage area is based on the damage indication received from the user.

In Example 21, the subject matter of Examples 18-20 includes, displaying a damage questionnaire to the user; and receiving a questionnaire response from the user, wherein an identification of the vehicle damage area is based on the questionnaire response received from the user.

In Example 22, the subject matter of Examples 18-21 includes, wherein the identification of the vehicle repair area is further based on the received damage indication.

In Example 23, the subject matter of Examples 1-22 includes, displaying a vehicle image to the user; and receiving a selection of one or more areas on the displayed vehicle image from the user, wherein an identification of the vehicle repair area is based on the selection received from the user.

In Example 24, the subject matter of Examples 1-23 includes, displaying a list of potential vehicle repair areas to the user; and receiving a selection of one or more items within the list of potential vehicle repair areas from the user, wherein an identification of the vehicle repair area is based on the selection received from the user.

In Example 25, the subject matter of Examples 1-24 includes, connecting an electronic vehicle self-diagnostic device to the vehicle; and receiving a vehicle self-diagnostic data from the vehicle, the vehicle self-diagnostic data including the identification of the vehicle and vehicle sensor data; wherein the identification of the vehicle safety feature calibration is further based on the vehicle sensor data.

In Example 26, the subject matter of Example 25 includes, wherein vehicle self-diagnostic data is received from an on-board diagnostic (OBD) device connected to the vehicle.

In Example 27, the subject matter of Examples 25-26 includes, receiving a plurality of vehicle system failure notifications, wherein the identification of the vehicle safety feature calibration is not indicated by the plurality of vehicle system failure notifications.

In Example 28, the subject matter of Examples 1-27 includes, identifying a vehicle safety system name associated with the vehicle safety feature calibration; and outputting the vehicle safety system name for display.

Example 29 is a method for identifying vehicle safety feature calibration, the method comprising: receiving a vehicle identification number (VIN); identifying a stored vehicle safety feature data set based on the VIN; displaying a vehicle image to the user; receiving a selection of one or more areas on the displayed vehicle image from the user, wherein an identification of at least one of a vehicle damage area or a vehicle repair area is based on the selection received from the user; and identifying a vehicle safety feature calibration based on the identified vehicle repair area and the stored vehicle safety feature data set.

Example 30 is a system for identifying vehicle safety feature calibration, the system comprising: processing circuitry; and a memory that includes, instructions, the instructions, when executed by the processing circuitry, cause the processing circuitry to: receive an identification of a vehicle; identify a stored vehicle safety feature data set based on the identification of the vehicle; receive an identification of a vehicle repair area; and identify a vehicle safety feature calibration based on the identified vehicle repair area and the stored vehicle safety feature data set.

In Example 31, the subject matter of Example 30 includes, wherein the stored vehicle safety feature data set includes a stored vehicle safety sensor data set.

In Example 32, the subject matter of Examples 30-31 includes, wherein the identification of the vehicle includes a vehicle identification number (VIN), and wherein the stored vehicle safety feature data set is identified based on the VIN.

In Example 33, the subject matter of Example 32 includes, the instructions further causing the processing circuitry to retrieve the VIN at an electronic device connected to an on-board diagnostic device connected to the vehicle.

In Example 34, the subject matter of Example 33 includes, the instructions further causing the processing circuitry to retrieve on-board diagnostic information at the electronic device via the on-board diagnostic device connected to the vehicle, wherein the identification of the vehicle safety feature calibration is further based on the retrieved on-board diagnostic information.

In Example 35, the subject matter of Examples 30-34 includes, the instructions further causing the processing circuitry to generate a calibration verification, the calibration verification confirming a performance of the vehicle safety feature calibration.

In Example 36, the subject matter of Example 35 includes, the instructions further causing the processing circuitry to generate a calibration certification document, wherein: the calibration certification document includes the generated calibration verification; and the calibration certification document identifies a plurality of vehicle sensor calibration test results and a vehicle calibration testing environment.

In Example 37, the subject matter of Examples 35-36 includes, wherein the generation of the calibration verification includes a confirmation with an original equipment manufacturer (OEM) calibration specification.

In Example 38, the subject matter of Examples 30-37 includes, the instructions further causing the processing circuitry to identify a vehicle damage area, wherein the identification of the vehicle repair area is at least partially based on the identified vehicle damage area.

In Example 39, the subject matter of Example 38 includes, wherein: the identified vehicle safety feature calibration is outside the vehicle damage area but within the vehicle repair area; and the identified vehicle safety feature calibration requires calibration in response to a modification to the vehicle repair area.

In Example 40, the subject matter of Examples 30-39 includes, the instructions further causing the processing circuitry to identify a vehicle safety feature within the vehicle repair area, wherein the identified vehicle safety feature requires calibration in response to a modification to the vehicle repair area.

In Example 41, the subject matter of Example 40 includes, the instructions further causing the processing circuitry to: generate calibration instructions for calibrating the identified vehicle safety feature; and output the calibration instructions for display.

In Example 42, the subject matter of Examples 40-41 includes, the instructions further causing the processing circuitry to: calibrate the identified vehicle safety feature; and verify the calibration of the identified vehicle safety feature.

In Example 43, the subject matter of Examples 40-42 includes, wherein the vehicle safety feature is part of at least one of an automatic emergency braking (AEB) system and an automated driver assistance system (ADAS).

In Example 44, the subject matter of Examples 38-43 includes, wherein the vehicle repair area includes at least one undamaged vehicle area that requires a vehicle part adjustment during a repair to the vehicle damage area.

In Example 45, the subject matter of Example 44 includes, wherein the vehicle part adjustment includes a vehicle wheel alignment, the instructions further causing the processing circuitry to: generate alignment instructions for the vehicle wheel alignment; and output the alignment instructions for display.

In Example 46, the subject matter of Examples 30-45 includes, the instructions further causing the processing circuitry to: receive a vehicle damage image; and compare the vehicle damage image to a stored undamaged vehicle image, wherein the identification of the vehicle damage area is based on the comparison of the vehicle damage image to the stored undamaged vehicle image.

In Example 47, the subject matter of Examples 38-46 includes, the instructions further causing the processing circuitry to receive a damage indication from a user, wherein the identification of the vehicle damage area is based on the damage indication received from the user.

In Example 48, the subject matter of Example 47 includes, the instructions further causing the processing circuitry to: display a vehicle image to the user; and receive the damage indication on the displayed vehicle image from the user, wherein an identification of the vehicle damage area is based on the damage indication received from the user.

In Example 49, the subject matter of Examples 47-48 includes, the instructions further causing the processing circuitry to: display a list of potential vehicle damage areas to the user; and receive the damage indication from the user based on a user selection of one or more items within the list of potential vehicle damage areas, wherein an identification of the vehicle damage area is based on the damage indication received from the user.

In Example 50, the subject matter of Examples 47-49 includes, the instructions further causing the processing circuitry to: display a damage questionnaire to the user; and receive a questionnaire response from the user, wherein an identification of the vehicle damage area is based on the questionnaire response received from the user.

In Example 51, the subject matter of Examples 47-50 includes, wherein the identification of the vehicle repair area is further based on the received damage indication.

In Example 52, the subject matter of Examples 30-51 includes, the instructions further causing the processing circuitry to: display a vehicle image to the user; and receive a selection of one or more areas on the displayed vehicle image from the user, wherein an identification of the vehicle repair area is based on the selection received from the user.

In Example 53, the subject matter of Examples 30-52 includes, the instructions further causing the processing circuitry to: display a list of potential vehicle repair areas to the user; and receive a selection of one or more items within the list of potential vehicle repair areas from the user, wherein an identification of the vehicle repair area is based on the selection received from the user.

In Example 54, the subject matter of Examples 30-53 includes, the instructions further causing the processing circuitry to: connect an electronic vehicle self-diagnostic device to the vehicle; and receive a vehicle self-diagnostic data from the vehicle, the vehicle self-diagnostic data including the identification of the vehicle and vehicle sensor data; wherein the identification of the vehicle safety feature calibration is further based on the vehicle sensor data.

In Example 55, the subject matter of Example 54 includes, wherein vehicle self-diagnostic data is received from an on-board diagnostic (OBD) device connected to the vehicle.

In Example 56, the subject matter of Examples 54-55 includes, the instructions further causing the processing circuitry to receive a plurality of vehicle system failure notifications, wherein the identification of the vehicle safety feature calibration is not indicated by the plurality of vehicle system failure notifications.

In Example 57, the subject matter of Examples 30-56 includes, the instructions further causing the processing circuitry to: identify a vehicle safety system name associated with the vehicle safety feature calibration; and output the vehicle safety system name for display.

Example 58 is a system for identifying vehicle safety feature calibration, the system comprising: processing circuitry; and a memory that includes, instructions, the instructions, when executed by the processing circuitry, cause the processing circuitry to: receive a vehicle identification number (VIN); identify a stored vehicle safety feature data set based on the VIN; display a vehicle image to the user; receive a selection of one or more areas on the displayed vehicle image from the user, wherein an identification of at least one of a vehicle damage area or a vehicle repair area is based on the selection received from the user; and identify a vehicle safety feature calibration based on the identified vehicle repair area and the stored vehicle safety feature data set.

Example 59 is at least one non-transitory machine-readable storage medium, comprising a plurality of instructions that, responsive to being executed with processor circuitry of a computer-controlled device, cause the computer-controlled device to: receive an identification of a vehicle; identify a stored vehicle safety feature data set based on the identification of the vehicle; receive identification of a vehicle repair area; and identify a vehicle safety feature calibration based on the identified vehicle repair area and the stored vehicle safety feature data set.

In Example 60, the subject matter of Example 59 includes, wherein the stored vehicle safety feature data set includes a stored vehicle safety sensor data set.

In Example 61, the subject matter of Examples 59-60 includes, wherein the identification of the vehicle includes a vehicle identification number (VIN), and wherein the stored vehicle safety feature data set is identified based on the VIN.

In Example 62, the subject matter of Example 61 includes, the instructions further causing the computer-controlled device to: connect an electronic device to an on-board diagnostic device connected to the vehicle; and retrieve the VIN at the electronic device via the on-board diagnostic device.

In Example 63, the subject matter of Example 62 includes, the instructions further causing the computer-controlled device to retrieve on-board diagnostic information at the electronic device via the on-board diagnostic device connected to the vehicle, wherein the identification of the vehicle safety feature calibration is further based on the retrieved on-board diagnostic information.

In Example 64, the subject matter of Examples 59-63 includes, the instructions further causing the computer-controlled device to generate a calibration verification, the calibration verification confirming a performance of the vehicle safety feature calibration.

In Example 65, the subject matter of Example 64 includes, the instructions further causing the computer-controlled device to generate a calibration certification document, wherein: the calibration certification document includes the generated calibration verification; and the calibration certification document identifies a plurality of vehicle sensor calibration test results and a vehicle calibration testing environment.

In Example 66, the subject matter of Examples 64-65 includes, wherein the generation of the calibration verification includes a confirmation with an original equipment manufacturer (OEM) calibration specification.

In Example 67, the subject matter of Examples 59-66 includes, the instructions further causing the computer-controlled device to identify a vehicle damage area, wherein the identification of the vehicle repair area is at least partially based on the identified vehicle damage area.

In Example 68, the subject matter of Example 67 includes, wherein: the identified vehicle safety feature calibration is outside the vehicle damage area but within the vehicle repair area; and the identified vehicle safety feature calibration requires calibration in response to a modification to the vehicle repair area.

In Example 69, the subject matter of Examples 59-68 includes, the instructions further causing the computer-controlled device to identify a vehicle safety feature within the vehicle repair area, wherein the identified vehicle safety feature requires calibration in response to a modification to the vehicle repair area.

In Example 70, the subject matter of Example 69 includes, the instructions further causing the computer-controlled device to: generate calibration instructions for calibrating the identified vehicle safety feature; and output the calibration instructions for display.

In Example 71, the subject matter of Examples 69-70 includes, the instructions further causing the computer-controlled device to: calibrate the identified vehicle safety feature; and verify the calibration of the identified vehicle safety feature.

In Example 72, the subject matter of Examples 69-71 includes, wherein the vehicle safety feature is part of at least one of an automatic emergency braking (AEB) system and an automated driver assistance system (ALAS).

In Example 73, the subject matter of Examples 67-72 includes, wherein the vehicle repair area includes at least one undamaged vehicle area that requires a vehicle part adjustment during a repair to the vehicle damage area.

In Example 74, the subject matter of Example 73 includes, wherein the vehicle part adjustment includes a vehicle wheel alignment, the method the instructions further causing the computer-controlled device to: generate alignment instructions for the vehicle wheel alignment; and output the alignment instructions for display.

In Example 75, the subject matter of Examples 59-74 includes, the instructions further causing the computer-controlled device to: receive a vehicle damage image; and compare the vehicle damage image to a stored undamaged vehicle image, wherein the identification of the vehicle damage area is based on the comparison of the vehicle damage image to the stored undamaged vehicle image.

In Example 76, the subject matter of Examples 67-75 includes, the instructions further causing the computer-controlled device to receive a damage indication from a user, wherein the identification of the vehicle damage area is based on the damage indication received from the user.

In Example 77, the subject matter of Example 76 includes, the instructions further causing the computer-controlled device to: display a vehicle image to the user; and receive the damage indication on the displayed vehicle image from the user, wherein an identification of the vehicle damage area is based on the damage indication received from the user.

In Example 78, the subject matter of Examples 76-77 includes, the instructions further causing the computer-controlled device to: display a list of potential vehicle damage areas to the user; and receive the damage indication from the user based on a user selection of one or more items within the list of potential vehicle damage areas, wherein an identification of the vehicle damage area is based on the damage indication received from the user.

In Example 79, the subject matter of Examples 76-78 includes, the instructions further causing the computer-controlled device to: display a damage questionnaire to the user; and receive a questionnaire response from the user, wherein an identification of the vehicle damage area is based on the questionnaire response received from the user.

In Example 80, the subject matter of Examples 76-79 includes, wherein the identification of the vehicle repair area is further based on the received damage indication.

In Example 81, the subject matter of Examples 59-80 includes, the instructions further causing the computer-controlled device to: display a vehicle image to the user; and receive a selection of one or more areas on the displayed vehicle image from the user, wherein an identification of the vehicle repair area is based on the selection received from the user.

In Example 82, the subject matter of Examples 59-81 includes, the instructions further causing the computer-controlled device to: display a list of potential vehicle repair areas to the user; and receive a selection of one or more items within the list of potential vehicle repair areas from the user, wherein an identification of the vehicle repair area is based on the selection received from the user.

In Example 83, the subject matter of Examples 59-82 includes, the instructions further causing the computer-controlled device to: connect an electronic vehicle self-diagnostic device to the vehicle; and receive a vehicle self-diagnostic data from the vehicle, the vehicle self-diagnostic data including the identification of the vehicle and vehicle sensor data; wherein the identification of the vehicle safety feature calibration is further based on the vehicle sensor data.

In Example 84, the subject matter of Example 83 includes, wherein vehicle self-diagnostic data is received from an on-board diagnostic (OBD) device connected to the vehicle.

In Example 85, the subject matter of Examples 83-84 includes, the instructions further causing the computer-controlled device to receive a plurality of vehicle system failure notifications, wherein the identification of the vehicle safety feature calibration is not indicated by the plurality of vehicle system failure notifications.

In Example 86, the subject matter of Examples 59-85 includes, the instructions further causing the computer-controlled device to: identify a vehicle safety system name associated with the vehicle safety feature calibration; and output the vehicle safety system name for display.

Example 87 is at least one machine-readable medium including instructions that, when executed by processing circuitry, cause the processing circuitry to perform operations to implement of any of Examples 1-86.

Example 88 is an apparatus comprising means to implement of any of Examples 1-86.

Example 89 is a system to implement of any of Examples 1-86.

Example 90 is a method to implement of any of Examples 1-86.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. In the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope should be determined with reference to the appended claims, along with the full scope of equivalents to which such claims are entitled.

What is claimed is:

1. A method for identifying vehicle safety sensor calibration, the method comprising:
    initiating an identification of a vehicle at a vehicle safety sensor identification application installed on an electronic device, the application configured to receive vehicle data and automatically identify a vehicle sensor calibration based on the vehicle data and an identified area of repair;

receiving vehicle identification data into the vehicle safety sensor identification application by capturing the vehicle identification data with a vehicle identification device associated with the electronic device;

retrieving, into the vehicle safety sensor identification application, a stored vehicle safety feature data set from an electronic vehicle safety feature database based on the vehicle identification data, the electronic database including a plurality of identified vehicles and associated vehicle safety feature data sets;

receiving, into the vehicle safety sensor identification application, an identification of a vehicle repair area, the vehicle repair area corresponding to an area of the vehicle;

automatically identifying, at the vehicle safety sensor identification application, a vehicle safety sensor calibration within the vehicle repair area based on the identified vehicle repair area and the stored vehicle safety feature data set, wherein the identified vehicle safety sensor calibration corresponds to an identified vehicle safety sensor that requires calibration in response to a modification to the vehicle repair area, and wherein the identified vehicle safety sensor is part of at least one of an automatic emergency braking (AEB) system or an automated driver assistance system (ADAS) of the vehicle;

based on the foregoing steps, generating calibration instructions specific to calibrating the identified vehicle safety sensor for the vehicle corresponding to the vehicle identification data; and outputting the calibration instructions for display.

2. The method of claim 1, wherein the vehicle identification device includes an image capture device to capture an image of a vehicle identification number (VIN) and the vehicle identification data is based on the image of the VIN.

3. The method of claim 1, further including identifying a vehicle damage area, wherein the identification of the vehicle repair area is at least partially based on the identified vehicle damage area.

4. The method of claim 3, wherein the vehicle repair area includes at least one undamaged vehicle area that requires a vehicle part adjustment during a repair to the vehicle damage area.

5. A system for identifying vehicle safety sensor calibration, the system comprising:

processing circuitry; and a memory that includes instructions, the instructions, when executed by the processing circuitry, cause the processing circuitry to:

initiate an identification of a vehicle at a vehicle safety sensor identification application installed on an electronic device, the application configured to receive vehicle data and automatically identify a vehicle sensor calibration based on the vehicle data and an identified area of repair;

capture vehicle identification data from a vehicle identification device associated with the electronic device;

retrieve, into the vehicle safety sensor identification application, a stored vehicle safety feature data set from an electronic database based on the vehicle identification data, the electronic database including a plurality of identified vehicles and associated vehicle safety feature data sets;

receive, into the vehicle safety sensor identification application, an identification of a vehicle repair area, the vehicle repair area corresponding to an area of the vehicle;

automatically identify, at the vehicle safety sensor identification application, a vehicle safety sensor calibration within the vehicle repair area based on the identified vehicle repair area and the stored vehicle safety feature data set, wherein the identified vehicle safety sensor calibration corresponds to an identified vehicle safety sensor that requires calibration in response to a modification to the vehicle repair area, and wherein the identified vehicle safety sensor is part of at least one of an automatic emergency braking (AEB) system or an automated driver assistance system (ADAS) of the vehicle;

based on the foregoing steps, generate calibration instructions specific to calibrating the identified vehicle safety sensor for the vehicle corresponding to the vehicle identification data; and output the calibration instructions for display.

6. The system of claim 5, wherein the vehicle identification device includes an on-board diagnostic device to communicate with the vehicle via a vehicle communication protocol, and wherein the instructions further cause the processing circuitry to:

communicatively connect the electronic device to the on-board diagnostic device connected to the vehicle; and retrieve the vehicle identification data at the electronic device from the on-board diagnostic device via the vehicle communication protocol.

7. The system of claim 5, wherein the instructions further cause the processing circuitry to identify a vehicle damage area, wherein the identification of the vehicle repair area is at least partially based on the identified vehicle damage area.

8. The system of claim 7, wherein the identified vehicle safety sensor is outside the vehicle damage area but within the vehicle repair area.

9. At least one non-transitory machine-readable storage medium, comprising instructions that, responsive to being executed with processor circuitry of a computer-controlled device, cause the computer-controlled device to:

initiate an identification of a vehicle at a vehicle safety sensor identification application installed on the computer-controlled device, the application configured to receive vehicle data and automatically identify a vehicle sensor calibration based on the vehicle data and an identified area of repair;

capture vehicle identification data from a vehicle identification device associated with the computer-controlled device;

retrieve, into the vehicle safety sensor identification application, a stored vehicle safety feature data set from an electronic database based on the vehicle identification data, the electronic database including a plurality of identified vehicles and associated vehicle safety feature data sets;

receive, into the vehicle safety sensor identification application, an identification of a vehicle repair area, the vehicle repair area corresponding to an area of the vehicle;

automatically identify, at the vehicle safety sensor identification application, a vehicle safety sensor calibration within the vehicle repair area based on the identified vehicle repair area and the stored vehicle safety feature data set, wherein the identified vehicle safety sensor calibration corresponds to an identified vehicle safety sensor that requires calibration in response to a modification to the vehicle repair area, and wherein the identified vehicle safety sensor is part of at least one of an automatic emergency braking (AEB) system or an automated driver assistance system (ADAS) of the vehicle;

based on the foregoing steps, generate calibration instructions specific to calibrating the identified vehicle safety sensor for the vehicle corresponding to the vehicle identification data; and output the calibration instructions for display.

10. The non-transitory machine-readable storage medium of claim 9, wherein the vehicle identification device includes an image capture device to capture an image of a vehicle identification number (VIN) and the vehicle identification data is based on the image of the VIN.

11. The non-transitory machine-readable storage medium of claim 9, wherein the instructions further cause the computer-controlled device to identify a vehicle damage area, wherein the identification of the vehicle repair area is at least partially based on the identified vehicle damage area.

12. The non-transitory machine-readable storage medium of claim 9, wherein the vehicle identification device includes an on-board diagnostic device to communicate with the vehicle via a vehicle communication protocol, and wherein the instructions further cause the computer-controlled device to:

communicatively connect to the on-board diagnostic device connected to the vehicle; and retrieve the vehicle identification data from the on-board diagnostic device via the vehicle communication protocol.

13. A method for identifying vehicle safety sensor calibration, the method comprising:

initiating an identification of a vehicle at a vehicle safety sensor identification application installed on an electronic device, the application configured to receive vehicle data and automatically identify a vehicle sensor calibration based on the vehicle data and an identified area of repair;

receiving vehicle identification data into the vehicle safety sensor identification application by capturing the vehicle identification data with a vehicle identification device associated with the electronic device;

retrieving, into the vehicle safety sensor identification application, a stored vehicle safety feature data set from an electronic vehicle safety feature database based on the vehicle identification data, the electronic vehicle safety feature database including a plurality of identified vehicles and associated vehicle safety feature data sets;

displaying a vehicle image to a user at the electronic device;

receiving a damage indication on the displayed vehicle image from the user, wherein an identification of a vehicle damage area is based on the damage indication received from the user;

receiving, into the vehicle safety sensor identification application, an identification of a vehicle repair area, the vehicle repair area corresponding to an area of the vehicle, wherein the identification of the vehicle repair area is at least partially based on the identified vehicle damage area; and automatically identifying, at the vehicle safety sensor identification application, a vehicle safety sensor calibration within the vehicle repair area based on the identified vehicle repair area and the stored vehicle safety feature data set, wherein the identified vehicle safety sensor calibration corresponds to an identified vehicle safety sensor that requires calibration in response to a modification to the vehicle repair area, and wherein the identified vehicle safety sensor is part of at least one of an automatic emergency braking (AEB) system or an automated driver assistance system (ADAS) of the vehicle.

14. The method of claim 13, further including:

generating calibration instructions for calibrating the identified vehicle safety sensor; and outputting the calibration instructions for display.

15. The method of claim 13, wherein the vehicle identification device includes an on-board diagnostic device to communicate with the vehicle via a vehicle communication protocol, the method further including:

communicatively connecting the electronic device to the on-board diagnostic device connected to the vehicle; and retrieving the vehicle identification data at the electronic device from the on-board diagnostic device via the vehicle communication protocol.

16. The method of claim 13, wherein the vehicle repair area includes at least one undamaged vehicle area that requires a vehicle part adjustment during a repair to the vehicle damage area.

17. A method for identifying vehicle safety sensor calibration, the method comprising:

initiating an identification of a vehicle at a vehicle safety sensor identification application installed on an electronic device, the application configured to receive vehicle data and automatically identify a vehicle sensor calibration based on the vehicle data and an identified area of repair;

receiving vehicle identification data into the vehicle safety sensor identification application by capturing the vehicle identification data with a vehicle identification device associated with the electronic device;

retrieving, into the vehicle safety sensor identification application, a stored vehicle safety feature data set from an electronic vehicle safety feature database based on the vehicle identification data, the electronic vehicle safety feature database including a plurality of identified vehicles and associated vehicle safety feature data sets;

displaying a vehicle image to a user at the electronic device;

receiving a selection of one or more areas on the displayed vehicle image from the user, wherein an identification of a vehicle repair area corresponding to an area of the vehicle is based on the selection received from the user; and automatically identifying, at the vehicle safety sensor identification application; a vehicle safety sensor calibration within the vehicle repair area based on the identified vehicle repair area and the stored vehicle safety feature data set, wherein the identified vehicle safety sensor calibration corresponds to an identified vehicle safety sensor that requires calibration in response to a modification to the vehicle repair area, and wherein the identified vehicle safety sensor is part of at least one of an automatic emergency braking (AEB) system or an automated driver assistance system (ADAS) of the vehicle.

18. The method of claim 17, further including:
generating calibration instructions for calibrating the identified vehicle safety sensor; and
outputting the calibration instructions for display.

19. The method of claim 17, wherein the vehicle identification device includes an on-board diagnostic device to communicate with the vehicle via a vehicle communication protocol, the method further including:
communicatively connecting the electronic device to the on-board diagnostic device connected to the vehicle; and
retrieving the vehicle identification data at the electronic device from the on-board diagnostic device via the vehicle communication protocol.

20. The method of claim 17, wherein the vehicle identification device includes an image capture device to capture an image of a vehicle identification number (VIN) and the vehicle identification data is based on the image of the VIN.

21. A method for identifying vehicle safety sensor calibration, the method comprising:
initiating an identification of a vehicle at a vehicle safety sensor identification application installed on an electronic device, the application configured to receive vehicle data and automatically identify a vehicle sensor calibration based on the vehicle data and an identified area of repair;
receiving vehicle identification data into the vehicle safety sensor identification application by capturing the vehicle identification data with a vehicle identification device associated with the electronic device;
retrieving, into the vehicle safety sensor identification application, a stored vehicle safety feature data set from an electronic vehicle safety feature database based on the vehicle identification data, the electronic vehicle safety feature database including a plurality of identified vehicles and associated vehicle safety feature data sets;
displaying a plurality of potential vehicle repair areas to a user at the electronic device;
receiving a selection of one or more repair areas within the displayed plurality of potential vehicle repair areas from the user, wherein an identification of a vehicle repair area corresponding to an area of the vehicle is based on the selection received from the user; and
automatically identifying, at the vehicle safety sensor identification application, a vehicle safety sensor calibration within the vehicle repair area based on the identified vehicle repair area and the stored vehicle safety feature data set, wherein the identified vehicle safety sensor calibration corresponds to an identified vehicle safety sensor that requires calibration in response to a modification to the vehicle repair area, and wherein the identified vehicle safety sensor is part of at least one of an automatic emergency braking (AEB) system or an automated driver assistance system (ADAS) of the vehicle.

22. The method of claim 21, further including:
generating calibration instructions for calibrating e identified vehicle safety sensor; and
outputting the calibration instructions for display.

23. The method of claim 21, wherein the vehicle identification device includes an on-board diagnostic device to communicate with the vehicle via a vehicle communication protocol, the method further including:
communicatively connecting the electronic device to the on-board diagnostic device connected to the vehicle; and
retrieving the vehicle identification data at the electronic device from the on-board diagnostic device via the vehicle communication protocol.

24. The method of claim 21, wherein the vehicle identification device includes an image capture device to capture an image of a vehicle identification number (VIN) and the vehicle identification data is based on the image of the VIN.

25. A system for identifying vehicle safety sensor calibration, the system comprising:
processing circuitry; and
a memory that includes instructions, the instructions; when executed by the processing circuitry, cause the processing circuitry to:
initiate an identification of a vehicle at a vehicle safety sensor identification application installed on an electronic device, the application configured to receive vehicle data and automatically identify a vehicle sensor calibration based on the vehicle data and an identified area of repair;
capture vehicle identification data from a vehicle identification device associated with the electronic device;
retrieve, into the vehicle safety sensor identification application, a stored vehicle safety feature data set from an electronic database based on the vehicle identification data, the electronic database including a plurality of identified vehicles and associated vehicle safety feature data sets;
display a vehicle image to a user at the electronic device;
receive a damage indication on the displayed vehicle image from the user, wherein an identification of a vehicle damage area is based on the damage indication received from the user;
receive, into the vehicle safety sensor identification application, an identification of a vehicle repair area, the vehicle repair area corresponding to an area of the vehicle, wherein the identification of the vehicle repair area is at least partially based on the identified vehicle damage area; and
automatically identify, at the vehicle safety sensor identification application, a vehicle safety sensor calibration within the vehicle repair area based on the identified vehicle repair area and the stored vehicle safety feature data set, wherein the identified vehicle safety sensor calibration corresponds to an identified vehicle safety sensor that requires calibration in response to a modification to the vehicle repair area, and wherein the identified vehicle safety sensor is part of at least one of an automatic emergency braking (AFB) system or an automated driver assistance system (ADAS) of the vehicle.

26. The system of claim 25, wherein the instructions further cause the processing circuitry to:
generate calibration instructions for calibrating the identified vehicle safety sensor; and
output the calibration instructions for display.

27. The system of claim 25, wherein the vehicle identification device includes an on-board diagnostic device to communicate with the vehicle via a vehicle communication protocol, and wherein the instructions further cause the processing circuitry to:

communicatively connect the electronic device to the on-board diagnostic device connected to the vehicle; and retrieve the vehicle identification data at the electronic device from the on-board diagnostic device via the vehicle communication protocol.

28. The system of claim 25, wherein the vehicle repair area includes at least one undamaged vehicle area that requires a vehicle part adjustment during a repair to the vehicle damage area.

29. A system for identifying vehicle safety sensor calibration, the system comprising:

processing circuitry; and a memory that includes instructions, the instructions, when executed by the processing circuitry, cause the processing circuitry to:

initiate an identification of a vehicle at a vehicle safety sensor identification application installed on an electronic device, the application configured to receive vehicle data and automatically identify a vehicle sensor calibration based on the vehicle data and an identified area of repair;

capture vehicle identification data from a vehicle identification device associated with the electronic device;

retrieve, into the vehicle safety sensor identification application, a stored vehicle safety feature data set from an electronic database based on the vehicle identification data, the electronic database including a plurality of identified vehicles and associated vehicle safety feature data sets;

display a vehicle image to a user at the electronic device;

receive a selection of one or more areas on the displayed vehicle image from the user, wherein an identification of a vehicle repair area corresponding to an area of the vehicle is based on the selection received from the user; and automatically identify, at the vehicle safety sensor identification application, a vehicle safety sensor calibration within the vehicle repair area based on the identified vehicle repair area and the stored vehicle safety feature data set, wherein the identified vehicle safety sensor calibration corresponds to an identified vehicle safety sensor that requires calibration in response to a modification to the vehicle repair area, and wherein the identified vehicle safety sensor is part of at least one of an automatic emergency braking (AEB) system or an automated driver assistance system (ADAS) of the vehicle.

30. The system of claim 29, wherein the instructions further cause the processing circuitry to:

generate calibration instructions for calibrating the identified vehicle safety sensor; and output the calibration instructions for display.

31. The system of claim 29, wherein the vehicle identification device includes an on-board diagnostic device to communicate with the vehicle via a vehicle communication protocol, and wherein the instructions further cause the processing circuitry to:

communicatively connect the electronic device to the on-board diagnostic device connected to the vehicle; and retrieve the vehicle identification data at the electronic device from the on-board diagnostic device via the vehicle communication protocol.

32. The system of claim 29, wherein the vehicle identification device includes an image capture device to capture an image of a vehicle identification number (VIN) and the vehicle identification data is based on the image of the VIN.

33. A system for identifying vehicle safety sensor calibration, the system comprising:

processing circuitry; and a memory that includes instructions, the instructions, when executed by the processing circuitry, cause the processing circuitry to:

initiate an identification of a vehicle at a vehicle safety sensor identification application installed on an electronic device, the application configured to receive vehicle data and automatically identify a vehicle sensor calibration based on the vehicle data and an identified area of repair;

capture vehicle identification data from a vehicle identification device associated with the electronic device;

retrieve, into the vehicle safety sensor identification application, a stored vehicle safety feature data set from an electronic database based on the vehicle identification data, the electronic database including a plurality of identified vehicles and associated vehicle safety feature data sets;

display a plurality of potential vehicle repair areas to a user at the electronic device;

receive a selection of one or more repair areas within the displayed plurality of potential vehicle repair areas from the user, wherein an identification of a vehicle repair area corresponding to an area of the vehicle is based on the selection received from the user; and automatically identify, at the vehicle safety sensor identification application, a vehicle safety sensor calibration within the vehicle repair area based on the identified vehicle repair area and the stored vehicle safety feature data set, wherein the identified vehicle safety sensor calibration corresponds to an identified vehicle safety sensor that requires calibration in response to a modification to the vehicle repair area, and wherein the identified vehicle safety sensor is part of at least one of an automatic emergency braking (AEB) system or an automated driver assistance system (ADAS) of the vehicle.

34. The system of claim 33, wherein the instructions further cause the processing circuitry to:

generate calibration instructions for calibrating the identified vehicle safety sensor; and output the calibration instructions for display.

35. The system of claim 33, wherein the vehicle identification device includes an on-board diagnostic device to communicate with the vehicle via a vehicle communication protocol, and wherein the instructions further cause the processing circuitry to:

communicatively connect the electronic device to the on-board diagnostic device connected to the vehicle; and retrieve the vehicle identification data at the electronic device from the on-board diagnostic device via the vehicle communication protocol.

36. The system of claim 33, wherein the vehicle identification device includes an image capture device to capture an image of a vehicle identification number (VIN) and the vehicle identification data is based on the image of the VIN.

37. At least one non-transitory machine-readable storage medium, comprising instructions that, responsive to being executed with processor circuitry of a computer-controlled device, cause the computer-controlled device to:

initiate an identification of a vehicle at a vehicle safety sensor identification application installed on the computer-controlled device, the application configured to receive vehicle data and automatically identify a vehicle sensor calibration based on the vehicle data and an identified area of repair;

capture vehicle identification data from a vehicle identification device associated with the computer-controlled device;

retrieve, into the vehicle safety sensor identification application, a stored vehicle safety feature data set from an electronic database based on the vehicle identification data, the electronic database including a plurality of identified vehicles and associated vehicle safety feature data sets;

display a vehicle image to a user at the computer-controlled device;

receive a damage indication on the displayed vehicle image from the user, wherein an identification of a vehicle damage area is based on the damage indication received from the user;

receive, into the vehicle safety sensor identification application, an identification of a vehicle repair area, the vehicle repair area corresponding to an area of the vehicle, wherein the identification of the vehicle repair area is at least partially based on the identified vehicle damage area; and automatically identify, at the vehicle safety sensor identification application, a vehicle safety sensor calibration within the vehicle repair area based on the identified vehicle repair area and the stored vehicle safety feature data set, wherein the identified vehicle safety sensor calibration corresponds to an identified vehicle safety sensor that requires calibration in response to a modification to the vehicle repair area, and wherein the identified vehicle safety sensor is part of at least one of an automatic emergency braking (AEB) system or an automated driver assistance system (ADAS) of the vehicle.

38. The non-transitory machine-readable storage medium of claim 37, wherein the instructions further cause the computer-controlled device to:

generate calibration instructions for calibrating the identified vehicle safety sensor; and output the calibration instructions for display.

39. The non-transitory machine-readable storage medium of claim 37, wherein the vehicle identification device includes an on-board diagnostic device to communicate with the vehicle via a vehicle communication protocol, and wherein the instructions further cause the computer-controlled device to:

communicatively connect to the on-board diagnostic device connected to the vehicle; and retrieve the vehicle identification data from the on-board diagnostic device via the vehicle communication protocol.

40. The non-transitory machine-readable storage medium of claim 37, wherein the vehicle repair area includes at least one undamaged vehicle area that requires a vehicle part adjustment during a repair to the vehicle damage area.

41. At least one non-transitory machine-readable storage medium, comprising instructions that, responsive to being executed with processor circuitry of a computer-controlled device, cause the computer-controlled device to:

initiate an identification of a vehicle at a vehicle safety sensor identification application installed on the computer-controlled device, the application configured to receive vehicle data and automatically identify a vehicle sensor calibration based on the vehicle data and an identified area of repair;

capture vehicle identification data from a vehicle identification device associated with the computer-controlled device;

retrieve, into the vehicle safety sensor identification application, a stored vehicle safety feature data set from an electronic database based on the vehicle identification data; the electronic database including a plurality of identified vehicles and associated vehicle safety feature data sets;

display a vehicle image to a user at the computer-controlled device;

receive a selection of one or more areas on the displayed vehicle image from the user, wherein an identification of a vehicle repair area corresponding to an area of the vehicle is based on the selection received from the user; and automatically identify, at the vehicle safety sensor identification application, a vehicle safety sensor calibration within the vehicle repair area based on the identified vehicle repair area and the stored vehicle safety feature data set, wherein the identified vehicle safety sensor calibration corresponds to an identified vehicle safety sensor that requires calibration in response to a modification to the vehicle repair area, and wherein the identified vehicle safety sensor is part of at least one of an automatic emergency braking (AEB) system or an automated driver assistance system (ADAS) of the vehicle.

42. The non-transitory machine-readable storage medium of claim 41, wherein the instructions further cause the computer-controlled device to:

generate calibration instructions for calibrating the identified vehicle safety sensor; and output the calibration instructions for display.

43. The non-transitory machine-readable storage medium of claim 41, wherein the vehicle identification device includes an on-board diagnostic device to communicate with the vehicle via a vehicle communication protocol; and wherein the instructions further cause the computer-controlled device to:

communicatively connect to the on-board diagnostic device connected to the vehicle; and retrieve the vehicle identification data from the on-board diagnostic device via the vehicle communication protocol.

44. The non-transitory machine-readable storage medium of claim 41, wherein the vehicle identification device includes an image capture device to capture an image of a vehicle identification number (VIN) and the vehicle identification data is based on the image of the VIN.

45. At least one non-transitory machine-readable storage medium, comprising instructions that, responsive to being executed with processor circuitry of a computer-controlled device, cause the computer-controlled device to:

initiate an identification of a vehicle at a vehicle safety sensor identification application installed on the computer-controlled device, the application configured to receive vehicle data and automatically identify a vehicle sensor calibration based on the vehicle data and an identified area of repair;

capture vehicle identification data from a vehicle identification device associated with the computer-controlled device;

retrieve; into the vehicle safety sensor identification application, a stored vehicle safety feature data set from an electronic database based on the vehicle identification data, the electronic database including a plurality of identified vehicles and associated vehicle safety feature data sets;

display a plurality of potential vehicle repair areas to a user at the computer-controlled device;

receive a selection of one or more repair areas within the displayed plurality of potential vehicle repair areas from the user, wherein an identification of a vehicle repair area corresponding to an area of the vehicle is based on the selection received from the user; and automatically identify, at the vehicle safety sensor identification application, a vehicle safety sensor calibration within the vehicle repair area based on the identified vehicle repair area and the stored vehicle safety feature data set, wherein the identified vehicle safety sensor calibration corresponds to an identified vehicle safety sensor that requires calibration in response to a modification to the vehicle repair area, and wherein the identified vehicle safety sensor is part of at least one of an automatic emergency braking (AEB) system or an automated driver assistance system (ADAS) of the vehicle.

46. The non-transitory machine-readable storage medium of claim 45, wherein the instructions further cause the computer-controlled device to:
generate calibration instructions for calibrating the identified vehicle safety sensor; and
output the calibration instructions for display.

47. The non-transitory machine-readable storage medium of claim 45, wherein the vehicle identification device includes an on-board diagnostic device to communicate with the vehicle via a vehicle communication protocol, and wherein the instructions further cause the computer-controlled device to:
communicatively connect to the on-board diagnostic device connected to the vehicle; and
retrieve the vehicle identification data from the on-board diagnostic device via the vehicle communication protocol.

48. The non-transitory machine-readable storage medium of claim 45, wherein the vehicle identification device includes an image capture device to capture an image of a vehicle identification number (VIN) and the vehicle identification data is based on the image of the VIN.

* * * * *

UNITED STATES PATENT AND TRADEMARK OFFICE
CERTIFICATE OF CORRECTION

PATENT NO. : 11,210,869 B2
APPLICATION NO. : 17/249025
DATED : December 28, 2021
INVENTOR(S) : Todd-Michael Balan Page 1 of 1

It is certified that error appears in the above-identified patent and that said Letters Patent is hereby corrected as shown below:

In the Claims

In Column 24, Line 60, in Claim 17, delete "application;" and insert --application,-- therefor In Column 25, Line 61, in Claim 22, delete "e" and insert --the-- therefor In Column 26, Line 15, in Claim 25, delete "instructions;" and insert --instructions,-- therefor In Column 26, Line 56, in Claim 25, delete "(AFB)" and insert --(AEB)-- therefor In Column 30, Line 13, in Claim 41, delete "data;" and insert --data,-- therefor In Column 30, Line 45, in Claim 43, delete "protocol;" and insert --protocol,-- therefor In Column 31, Line 4, in Claim 45, delete "retrieve;" and insert --retrieve,-- therefor Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*